(12) United States Patent
Akif et al.

(10) Patent No.: US 12,172,684 B2
(45) Date of Patent: Dec. 24, 2024

(54) MANAGING VEHICLE ENERGY USE BASED ON FUTURE ENERGY DEMAND

(71) Applicant: Progress Rail Services Corporation, Albertville, AL (US)

(72) Inventors: Sammy Akif, Northlake, TX (US); Sidarta Fornari Beltramin, Curitiba (BR); Evan P Sevel, Wexford, PA (US); John William Brand, Merritt Island, FL (US)

(73) Assignee: Progress Rail Services Corporation, Albertville, AL (US)

( * ) Notice: Subject to any disclaimer, the term of this patent is extended or adjusted under 35 U.S.C. 154(b) by 206 days.

(21) Appl. No.: 17/993,337

(22) Filed: Nov. 23, 2022

(65) Prior Publication Data
US 2024/0166249 A1    May 23, 2024

(51) Int. Cl.
| | |
|---|---|
| *B61L 27/16* | (2022.01) |
| *B60L 3/00* | (2019.01) |
| *B60L 53/64* | (2019.01) |
| *B61L 15/00* | (2006.01) |

(52) U.S. Cl.
CPC ......... *B61L 15/0058* (2024.01); *B60L 3/0046* (2013.01); *B60L 53/64* (2019.02); *B61L 27/16* (2022.01); *B60L 2200/26* (2013.01)

(58) Field of Classification Search
CPC .... B61L 15/0058; B61L 27/16; B60L 3/0046; B60L 2200/26; B60L 53/64
See application file for complete search history.

(56) References Cited

U.S. PATENT DOCUMENTS

| | | | |
|---|---|---|---|
| 6,591,758 B2 | 7/2003 | Kumar | |
| 7,715,958 B2* | 5/2010 | Kumar | ............... B60L 50/53 701/19 |
| 7,925,426 B2 | 4/2011 | Koebler et al. | |
| 8,768,543 B2 | 7/2014 | Kumar et al. | |
| 2024/0034296 A1* | 2/2024 | Palmisano | ...... B60W 30/18127 |

* cited by examiner

Primary Examiner — Jacob M Amick

(57) ABSTRACT

A system includes one or more processors and memory storing processor-executable instructions that cause the one or more processors to perform operations. The operations include generating a driving strategy for a traveling route of a train comprising at least one battery-electric locomotive (BEL) based on saved data in the system for optimizing one or more aspects for the train over the traveling route; operating the train according to the driving strategy; receiving update data associated with a current location of the train; revising the driving strategy based on the saved data and the update data for optimizing energy consumption efficiency for a segment of the traveling route by identifying active powered components of the train that are non-essential for traversing the segment and turning off power to one or more of the identified active powered components for a duration of traversing the segment.

20 Claims, 9 Drawing Sheets

MANAGING VEHICLE ENERGY USE BASED ON FUTURE ENERGY DEMAND

TECHNICAL FIELD

The present disclosure relates generally to a system and method for optimizing train driving, and more particularly, to a system and method for optimizing energy usage based on anticipated demand for driving the train.

BACKGROUND

Rail vehicles may include multiple powered units, such as locomotives, that are mechanically coupled or linked together in a consist. The consist of powered units operates to provide tractive and/or braking efforts to propel and stop movement of the rail vehicles. The powered units in the consist may change the supplied tractive and/or braking efforts based on a data message that is communicated to the powered units. For example, the supplied tractive and/or braking efforts may be based on Energy Management software instructions or control information for an upcoming trip. The control information may be used by a software application to determine the speed of the rail vehicle for various segments of an upcoming trip of the rail vehicle. Control systems and subsystems for controlling and monitoring the tractive and/or braking efforts performed by one or more locomotives of the rail vehicle and performing other operations associated with the locomotives and other rail cars in a train may be located in part on the rail vehicle and/or distributed across one or more servers off-board the vehicle at one or more remote control stations.

A goal in the operation of the locomotives and other rail cars in a train is to provide the most accurate and up-to-date information regarding operational characteristics of the entire train and all computer systems and subsystems of the train to a human or autonomous operator located on-board or at a remote controller interface. In order to achieve the goal, e.g., of providing automatic train operation (ATO), a reliable, precisely calibrated and synchronized computerized control system must be provided in order to transmit train control commands and other data indicative of operational characteristics associated with the various computer systems and subsystems of the locomotive consists and other rail cars between the train and an off-board remote controller interface (also sometimes referred to as the "back office"). The control system must be capable of transmitting data messages having the information used to control the tractive and/or braking efforts of the rail vehicle and other operational characteristics of the various consist subsystems while the rail vehicle is moving. The control system must also be able to transmit information regarding a detected fault on-board a locomotive, and possibly respond with control commands to reset the fault. There is also a need for a train tracking and monitoring system that determines and presents current, real-time position information for one or more trains in a railroad network, the configuration or arrangement of powered and non-powered units within each of the trains, and operational status of the various systems and subsystems of the trains that are being tracked. Advances in the bandwidth, throughput, data transmission speeds, and other capabilities of various telecommunication networks, including 5G wireless communication networks, enables the placement of a large number of sensor devices throughout the train, and communication of sensor data to and from various control systems and subsystems of the trains. The control systems and subsystems may be distributed locally on leading and trailing consists of the trains, and/or remotely, off-board the trains at one or more distributed remote servers or control centers such as the back office and other control centers connected over the Internet. Proper synchronization, calibration, and coordination between the distributed control systems is important for determining the exact configuration of the train and operational status of all train assets, systems, and subsystems at any point in time, and implementing reconfiguration of train assets and/or changes in operational parameters of the systems and subsystems when necessary to meet operational goals.

One example of a control system for controlling a powered system, such as a train, to improve efficiency of operation of the powered system is disclosed in U.S. Pat. No. 7,715,958 of Kumar, that was published on May 11, 2010 ("the '958 patent"). In particular, the '958 patent discloses an energy management system for use with one of a plurality of hybrid energy diesel electric vehicles. The energy management system of the '958 patent includes a position identification device to provide position information of one the plurality of vehicles at incremental positions along one of a plurality of routes and a database to store historical data of a traction and/or auxiliary energy demand for each vehicle at incremental positions along each route. The energy management system retrieves historical data of each vehicle at incremental positions along each route to estimate an anticipated traction and/or auxiliary energy demand of the one of a plurality of vehicle at each incremental position along one of a plurality of routes.

Although useful in estimating the anticipated traction and/or auxiliary energy demand for a locomotive at each incremental position along the route, the energy management system of the '958 patent may be limited. In particular, while the '958 patent describes determining a power storage requirement and a power transfer requirement based on the anticipated traction and/or auxiliary energy demand, the '958 patent does not describe a system for reducing the auxiliary energy demand.

The systems and methods described herein are directed to addressing one or more of the drawbacks set forth above.

SUMMARY

According to a first aspect, a system includes one or more processors and memory communicatively coupled to the one or more processors. The memory stores processor-executable instructions that, when executed by the one or more processors, cause the one or more processors to perform operations. The operations include generating, by an analytics engine of the system, a driving strategy for a traveling route of a train based on saved data in the system for optimizing one or more aspects for the train over the traveling route, the train comprising at least one battery-electric locomotive (BEL); operating, by a locomotive control system of the system, the train according to the driving strategy; receiving, by an energy management system of the system, update data associated with a current location of the train; revising, by the analytics engine, the driving strategy based on the saved data and the update data, for optimizing energy consumption efficiency for a segment of the traveling route associated with the current location, including: identifying active powered components of the train that are non-essential for traversing the segment and turning off power to one or more of the identified active powered components for a duration of traversing the segment; and operating, by the locomotive control system, the train according to the revised driving strategy.

According to another aspect, a method may include generating, by an analytics engine of a system, a driving strategy for a traveling route of a train based on saved data in the system for optimizing one or more aspects for the train over the traveling route, the train comprising at least one battery-electric locomotive (BEL); operating, by a locomotive control system of the system, the train according to the driving strategy; receiving, by an energy management system of the system, update data associated with a current location of the train; revising, by the analytics engine, the driving strategy based on the saved data and the update data, for optimizing energy consumption efficiency for a segment of the traveling route associated with the current location, including: identifying active powered components of the train that are non-essential for traversing the segment and turning off power to one or more of the identified active powered components for a duration of traversing the segment; and operating, by the locomotive control system, the train according to the revised driving strategy.

According to yet another aspect, non-transitory computer-readable medium may store thereon processor-executable instructions that, when executed by one or more processors of a system, cause the one or more processors to perform certain operations. The operations include generating, by an analytics engine of the system, a driving strategy for a traveling route of a train based on saved data in the system for optimizing one or more aspects for the train over the traveling route, the train comprising at least one battery-electric locomotive (BEL); operating, by a locomotive control system of the system, the train according to the driving strategy; receiving, by an energy management system of the system, update data associated with a current location of the train; revising, by the analytics engine, the driving strategy based on the saved data and the update data, for optimizing energy consumption efficiency for the segment of the traveling route associated with the current location, including: identifying active powered components of the train that are non-essential for traversing the segment and turning off power to one or more of the identified active powered components for a duration of traversing the segment by, at least one of reducing power supplied to the one or more of the identified active powered components for the duration of traversing the segment or reducing operation of the one or more of the identified active powered components for the duration of traversing the segment; and operating, by the locomotive control system, the train according to the revised driving strategy.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
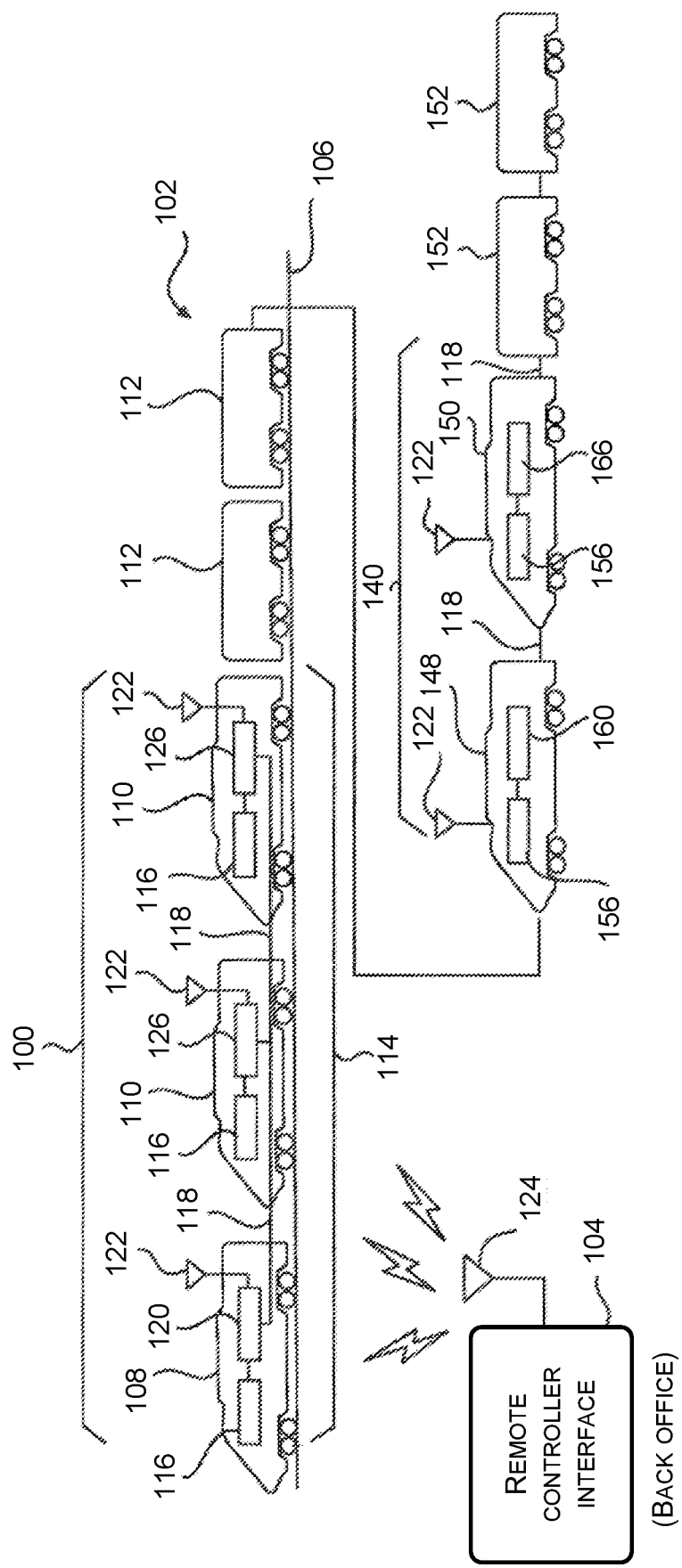
FIG. 1 is a schematic diagram of one embodiment of a control system for a train.

FIG. 1 is a schematic diagram of one embodiment of a control system 100 for operating a train 102 on a track 106. The train 102 may be stationary on the track 106 getting ready to depart or may be traveling along the track 106. The train may include multiple rail cars (including powered and/or non-powered rail cars or units) linked together as one or more consists or a single rail car (a powered or non-powered rail car or unit). The control system 100 may provide for cost savings, improved safety, increased reliability, operational flexibility, and convenience in the control of the train 102 through communication of network data between an off-board remote controller interface 104 and the train 102. The control system 100 may also provide a means for remote operators or third party operators to communicate with the various locomotives or other powered units of the train 102 from remote interfaces that may include any computing device connected to the Internet or other wide area or local communications network.

The control system 100 may be used to convey a variety of network data and command and control signals in the form of messages communicated to the train 102, such as packetized data or information that is communicated in data packets, from the off-board remote controller interface 104. The off-board remote controller interface 104 may also be configured to receive remote alerts and other data from a controller on-board the train, and forward those alerts and data to desired parties via pagers, mobile telephone, email, and online screen alerts. The data communicated between the train 102 and the off-board remote controller interface 104 may include signals indicative of various operational parameters associated with components and subsystems of the train, signals indicative of fault conditions, signals indicative of maintenance activities or procedures, and command and control signals operative to change the state of various circuit breakers, throttles, brake controls, actuators, switches, handles, relays, and other electronically-controllable devices on-board any locomotive or other powered unit of the train 102. The off-board remote controller interface 104 also enables the distribution of the various computer systems such as control systems and subsystems involved in operation of the train or monitoring of train operational characteristics at one or more remote locations off-board the train and accessible by authorized personnel over the Internet, wireless telecommunication networks, and by other means. In various exemplary embodiments, a centralized or cloud-based computer processing system may be located in one or more of a back-office server or a plurality of servers remote from the train. One or more distributed, edge-based computer processing systems may be located on-board one or more locomotives of the train, and each of the distributed computer processing systems may be communicatively connected to the centralized computer processing system.

Control system 100 may be configured to use artificial intelligence for maintaining synchronization between centralized (cloud-based) and distributed (edge-based) train control models. Control system 100 may include a centralized or cloud-based computer processing system located in one or more of a back-office server or a plurality of servers remote from train 102, one or more distributed, edge-based computer processing systems located on-board one or more locomotives of the train. Each of the distributed computer processing systems is communicatively connected to the centralized computer processing system, and a data acquisition hub is communicatively connected to one or more of databases and a plurality of sensors associated with the one or more locomotives or other components of the train. The da acquisition hub is configured to acquire real-time and historical configuration, structural, and operational data in association with inputs derived from real time and historical contextual data relating to a plurality of trains operating under a variety of different conditions for use as training data.

Control system 100 may also include a centralized virtual system modeling engine included in the centralized computer processing system and be configured to create one or more centralized models of one or more actual train control systems in operation on-board the one of more locomotives of the train based at least in part on data received from the data acquisition hub. A first one of the centralized models is utilized in a process of generating a first set of output control commands for a first train control scenario implemented by an energy management system associated with one or more of the locomotives. One or more distributed virtual system modeling engines are included in one or more of the distributed computer processing systems, and each of the one or more distributed virtual system modeling engines is configured to create one or more edge-based models of one or more actual train control systems in operation on-board the one or more locomotives of the train based at least in part on data received from the data acquisition hub. A first one of the edge-based models is utilized in a process of generating a second set of output control commands for a second train control scenario implemented by the energy management system associated with the one or more of the locomotives.

A machine learning engine may be included in at least one of the centralized and distributed computer processing systems. The machine learning engine may be configured to receive the training data from the data acquisition hub, receive the first centralized model from the centralized virtual system modeling engine, receive the first edge-based model from one of the distributed virtual system modeling engines, and compare the first set of output control commands generated by the first centralized model for the first train control scenario and the second set of output control commands generated by the first edge-based model for the second train control scenario. The machine learning engine may train a learning system using the training data to enable the machine learning engine to safely mitigate a divergence discovered between the first and second sets of output control commands using a learning function including at least one learning parameter. Training the learning system may include providing the training data as an input to the learning function. The learning function may be configured to use the at least one learning parameter to generate an output based on the input, cause the learning function to generate the output based on the input, and compare the output to one or more of the first and second sets of output control commands to determine a difference between the output and the one or more of the first and second sets of output control commands. The learning function may modify the at least one learning parameter and the output of the learning function to decrease the difference responsive to the difference being greater than a threshold difference and based at least in part on actual real time and historical information on in-train forces and train operational characteristics acquired from a plurality of trains operating under a variety of different conditions. An energy management system associated with the one or more locomotives of the train may be configured to adjust one or more of throttle requests, dynamic braking requests, and pneumatic braking requests for the one or more locomotives of the train based at least in part on the modified output of the learning function used by the learning system which has been trained by the machine learning engine.

Some control strategies undertaken by the control system 100 may include asset protection provisions, whereby asset operations are automatically derated or otherwise reduced in order to protect train assets, such as a locomotive, from entering an overrun condition and sustaining damage. For example, when the control system detects via sensors that the coolant temperature, oil temperature, crankcase pressure, or another operating parameter associated with a locomotive has exceeded a threshold, the control system may be configured to automatically reduce engine power (e.g., via a throttle control) to allow the locomotive to continue the current mission with a reduced probability of failure. In addition to derating or otherwise reducing certain asset operations based on threshold levels of operational parameters, asset protection may also include reducing or stopping certain operations based on the number, frequency, or timing of maintenance operations or faults detected by various sensors. In some cases, the control system may be configured to fully derate the propulsion systems of the locomotive and/or bring the train 102 to a complete stop to prevent damage to the propulsion systems in response to signals generated by sensors. In this way, the control system may automatically exercise asset protection provisions of its control strategy to reduce incidents of debilitating failure and the costs of associated repairs.

At times, however, external factors may dictate that the train 102 should continue to operate without an automatic reduction in engine power, or without bringing the train to a complete stop. The costs associated with failing to complete a mission on time can outweigh the costs of repairing one or more components, equipment, subsystems, or systems of a locomotive. In one example, a locomotive of the train may be located near or within a geo-fence characterized by a track grade or other track conditions that require the train 102 to maintain a certain speed and momentum in order to avoid excessive wheel slippage on the locomotive, or even stoppage of the train on the grade. Factors such as the track grade, environmental factors, and power generating capabilities of one or more locomotives approaching or entering the predetermined geo-fence may result in an unacceptable delay if the train were to slow down or stop. In certain situations, the train may not even be able to continue forward if enough momentum is lost, resulting in considerable delays and expense while additional locomotives are moved to the area to get the train started again. In some implementations of this disclosure the geo-fences may be characterized as no-stop zones, unfavorable-stop zones, or favorable-stop zones.

In situations when a train is approaching a geo-fence characterized as one of the above-mentioned zones, managers of the train 102 may wish to temporarily modify or disable asset protection provisions associated with automatic control of the locomotive to allow the train 102 to complete its mission on time. However, managers having the responsibility or authority to make operational decisions with such potentially costly implications may be off-board the train 102 or away from a remote controller interface, such as at a back office or other network access point. To avoid unnecessary delays in reaching a decision to temporarily modify or disable asset protection provisions of automatic train operation (ATO), the control system 100 may be configured to facilitate the selection of ride-through control levels via a user interface at an on-board controller or at the off-board remote controller interface 104. The control system 100 may also be configured to generate a ride-through control command signal including information that may be used to direct the locomotive to a geo-fence with a more favorable stop zone.

The off-board remote controller interface 104 may be connected with an antenna module 124 configured as a wireless transmitter or transceiver to wirelessly transmit data messages and control commands to the train 102. Additionally, or alternative, the off-board remote controller interface 104 may communicate with the train 102 via a wired communication system. The messages and commands may originate elsewhere, such as in a rail-yard back office system, one or more remotely located servers (such as in the "cloud"), a third party server, a computer disposed in a rail-yard tower, and the like, and be communicated to the off-board remote controller interface 104 by wired and/or wireless connections. Alternatively, the off-board remote controller interface 104 may be a satellite that transmits the messages and commands down to the train 102 or a cellular tower disposed remote from the train 102 and the track 106. Other devices may be used as the off-board remote controller interface 104 to wirelessly transmit the messages. For example, other wayside equipment, base stations, or back office servers may be used as the off-board remote controller interface 104. By way of example only, the off-board remote controller interface 104 may use one or more of the Transmission Control Protocol (TCP), Internet Protocol (IP), TCP/IP, User Datagram Protocol (UDP), or Internet Control Message Protocol (ICMP) to communicate network data over the Internet with the train 102.

As described below, the network data can include information used to automatically and/or remotely control operations of the train 102 or subsystems of the train 102, and/or reference information stored and used by the train 102 during operation of the train 102. The network data communicated to the off-board remote controller interface 104 from the train 102 may also provide alerts and other operational information that allows for remote monitoring, diagnostics, asset management, and tracking of the state of health of all of the primary power systems and auxiliary subsystems such as HVAC, air brakes, lights, event recorders, and the like. The increased use of distributed computer system processing enabled by advances in network communications, including but not limited to 5G wireless telecommunication networks, allows for the remote location of distributed computer system processors that may perform intensive calculations and/or access large amounts of real-time and historical data related to the train operational parameters. This distributed computer system processing may also introduce potential breakdowns in communication or transient latency issues between the distributed nodes of the communication network, leading to potential synchronization and calibration problems between various computer control systems and subsystems. The control system 100 and/or off-board remote control interface 104, according to various embodiments of this disclosure, may employ artificial intelligence algorithms and/or machine learning engines or processing modules to train learning algorithms and/or create virtual system models and perform comparisons between real-time data, historical data, and/or predicted data, to find indicators or patterns in which the distributed computer systems may face synchronization problems. The early identification of any potential synchronization or calibration problems between the various distributed computer systems or subsystems using machine learning and virtual system models enables early implementation of proactive measures to mitigate the problems.

A train may include powered locomotives in a lead consist and/or a trailing consist. The train 102 may include a lead consist 114 of powered locomotives, including the interconnected powered units 108 and 110, one or more remote or trailing consists 140 of powered locomotives, including powered units 148, 150, and additional non-powered units 112, 152. "Powered units" refers to rail cars that are capable of self-propulsion, such as diesel-electric locomotives, battery-electric locomotives, and hybrid locomotives. "Non-powered units" refers to rail cars that are incapable of self-propulsion, but which may otherwise receive electric power for other services. For example, freight cars, passenger cars, and other types of rail cars that do not propel themselves may be "non-powered units", even though the cars may receive electric power for auxiliary functions, such as cooling, heating, communications, lighting, and other functions.

In the illustrated embodiment of FIG. 1, the powered units 108, 110 represent locomotives joined with each other in the lead consist 114. The lead consist 114 represents a group of two or more locomotives in the train 102 that are mechanically coupled or linked together to travel along a route. The lead consist 114 may be a subset of the train 102 such that the lead consist 114 is included in the train 102 along with additional trailing consists of locomotives, such as trailing consist 140, and additional non-powered units 152, such as freight cars or passenger cars. While the train 102 in FIG. 1 is shown with a lead consist 114, and a trailing consist 140, alternatively the train 102 may include other numbers of locomotive consists joined together or interconnected by one or more intermediate powered or non-powered units that do not form part of the lead and trailing locomotive consists.

The powered units 108, 110 of the lead consist 114 include a lead powered unit 108, such as a lead locomotive, and one or more trailing powered units 110, such as trailing locomotives. As used herein, the terms "lead" and "trailing" are designations of different powered units, and do not necessarily reflect positioning of the powered units 108, 110 in the train 102 or the lead consist 114. For example, a lead powered unit may be disposed between two trailing powered units. Alternatively, the term "lead" may refer to the first powered unit in the train 102, the first powered unit in the lead consist 114, and the first powered unit in the trailing consist 140. The term "trailing" powered units may refer to powered units positioned after a lead powered unit. In another embodiment, the term "lead" refers to a powered unit that is designated for primary control of the lead consist 114 and/or the trailing consist 140, and "trailing" refers to powered units that are under at least partial control of a lead powered unit.

The powered units 108, 110 include a connection at each end of the powered unit 108, 110 to couple propulsion subsystems 116 of the powered units 108, 110 such that the powered units 108, 110 in the lead consist 114 function together as a single tractive unit. The propulsion subsystems 116 may include electric and/or mechanical devices and components, such as diesel engines, electric generators, batteries, and traction motors, used to provide tractive effort that propels the powered units 108, 110 and braking effort, dynamic or pneumatic, that slows the powered units 108, 110.

Similar to the lead consist 114, the embodiment shown in FIG. 1 also includes the trailing consist 140, including a lead powered unit 148 and a trailing powered unit 150. The trailing consist 140 may be located at a rear end of the train 102, or at some intermediate point along the train 102. Non-powered units 112 may separate the lead consist 114 from the trailing consist 140, and additional non-powered units 152 may be pulled behind the trailing consist 140.

The propulsion subsystems 116 of the powered units 108, 110 in the lead consist 114 may be connected and communicatively coupled with each other by a network connection 118. In one embodiment, the network connection 118 includes a net port and jumper cable that extends along the train 102 and between the powered units 108, 110. The network connection 118 may be a cable that includes twenty seven pins on each end that is referred to as a multiple unit cable, or MU cable. Alternatively, a different wire, cable, or bus, or other communication medium, may be used as the network connection 118. For example, the network connection 118 may represent an Electrically Controlled Pneumatic Brake line (ECPB), a fiber optic cable, or wireless connection—such as over a 5G telecommunication network. Similarly, the propulsion subsystems 156 of the powered units 148, 150 in the trailing consist 140 may be connected and communicatively coupled to each other by the network connection 118, such as a MU cable extending between the powered units 148, 150, or wireless connections.

The network connection 118 may include several channels over which network data is communicated. Each channel may represent a different pathway for the network data to be communicated. For example, different channels may be associated with different wires or busses of a multi-wire or multi-bus cable. Alternatively, the different channels may represent different frequencies or ranges of frequencies over which the network data is transmitted.

The powered units 108, 110 may include communication units 120, 126 configured to communicate information used in the control operations of various components and subsystems, such as the propulsion subsystems 116 of the powered units 108, 110. The communication unit 120 disposed in the lead powered unit 108 may be referred to as a lead communication unit. The lead communication unit 120 may be the unit that initiates the transmission of data packets forming a message to the off-board remote controller interface 104. For example, the lead communication unit 120 may transmit a message via a WiFi or cellular modem to the off-board remote controller interface 104. The message may contain information on an operational state of the lead powered unit 108, such as a throttle setting, a brake setting, readiness for dynamic or pneumatic braking, the tripping of a circuit breaker on-board the lead powered unit, or other operational characteristics. Additional operational information associated with a locomotive such as an amount of wheel slippage, wheel temperatures, wheel bearing temperatures, brake temperatures, and dragging equipment detection may also be communicated from sensors on-board a locomotive or other train asset, or from various sensors located in wayside equipment or sleeper ties positioned at intervals along the train track.

The communication units 126 may be disposed in different trailing powered units 110 and may be referred to as trailing communication units. Alternatively, one or more of the communication units 120, 126 may be disposed outside of the corresponding powered units 108, 110, such as in a nearby or adjacent non-powered unit 112. Another lead communication unit 160 may be disposed in the lead powered unit 148 of the trailing consist 140. The lead communication unit 160 of the trailing consist 140 may be a unit that receives data packets forming a message transmitted by the off-board remote controller interface 104. For example, the lead communication unit 160 of the trailing consist 140 may receive a message from the off-board remote controller interface 104 providing operational commands that are based upon the information transmitted to the off-board remote controller interface 104 via the lead communication unit 120 of the lead powered unit 108 of the lead consist 114. In another example, the lead communication unit 160 of the trailing consist 140 may communicate directly with the lead communication unit 120 of the lead powered unit 108 of the lead consist 114, and vice versa. A trailing communication unit 166 may be disposed in a trailing powered unit 150 of the trailing consist 140, and interconnected with the lead communication unit 160 via the network connection 118.

The communication units 120, 126 in the lead consist 114, and the communication units 160, 166 in the trailing consist 140 may be connected with the network connection 118 such that all of the communication units for each consist are communicatively coupled with each other by the network connection 118 and linked together in a computer network. Alternatively, the communication units may be linked by another wire, cable, or bus, or be linked by one or more wireless connections.

The networked communication units 120, 126, 160, 166 may include antenna modules 122. The antenna modules 122 may represent separate individual antenna modules or sets of antenna modules disposed at different locations along the train 102. For example, an antenna module 122 may represent a single wireless receiving device, such as a single 220 MHz TDMA antenna module, a single cellular modem, a single wireless local area network (WLAN) antenna module (such as a "Wi-Fi" antenna module capable of communicating using one or more of the IEEE 802.11 standards or another standard), a single WiMax (Worldwide Interoperability for Microwave Access) antenna module, a single satellite antenna module (or a device capable of wirelessly receiving a data message from an orbiting satellite), a single 3G antenna module, a single 4G antenna module, a single 5G antenna module, and the like. As another example, an antenna module 122 may represent a set or array of antenna modules, such as multiple antenna modules having one or more TDMA antenna modules, cellular modems, Wi-Fi antenna modules, WiMax antenna modules, satellite antenna modules, 3G antenna modules, 4G antenna modules, and/or 5G antenna modules.

As shown in FIG. 1, the antenna modules 122 may be disposed at spaced apart locations along the length of the train 102. For example, the single or sets of antenna modules represented by each antenna module 122 may be separated from each other along the length of the train 102 such that each single antenna module or antenna module set is disposed on a different powered or non-powered unit 108, 110, 112, 148, 150, 152 of the train 102. The antenna modules 122 may be configured to send data to and receive data from the off-board remote controller interface 104. For example, the off-board remote controller interface 104 may include an antenna module 124 that wirelessly communicates the network data from a remote location that is off of the track 106 to the train 102 via one or more of the antenna modules 122.

Alternatively, the antenna modules 122 may be connectors or other components that engage a pathway over which network data is communicated, such as through an Ethernet connection.

The diversity antenna modules 122 enable the train 102 to receive the network data transmitted by the off-board remote controller interface 104 at multiple locations along the train 102. Increasing the number of locations where the network data can be received by the train 102 may increase the probability that all, or a substantial portion, of a message conveyed by the network data is received by the train 102. For example, if some antenna modules 122 are temporarily blocked or otherwise unable to receive the network data as the train 102 is moving relative to the off-board remote controller interface 104, other antenna modules 122 that are not blocked and are able to receive the network data may receive the network data. An antenna module 122 receiving data and command control signals from the off-board remote controller interface 104 may in turn re-transmit that received data and signals to the appropriate lead communication unit 120 of the lead locomotive consist 114, or the lead communication unit 160 of the trailing locomotive consist 140. Any data packet of information received from the off-board remote controller interface 104 may include header information or other means of identifying which locomotive in which locomotive consist the information is intended for. Although the lead communication unit 120 on the lead consist may be the unit that initiates the transmission of data packets forming a message to the off-board remote controller interface 104, all of the lead and trailing communication units may be configured to receive and transmit data packets forming messages. Accordingly, in various alternative implementations according to this disclosure, a command control signal providing operational commands for the lead and trailing locomotives may originate at the off-board remote controller interface 104 rather than at the lead powered unit 108 of the lead consist 114.

Each locomotive or powered unit of the train 102 may include a car body supported at opposing ends by a plurality of trucks. Each truck may be configured to engage the track 106 via a plurality of wheels, and to support a frame of the car body. One or more traction motors may be associated with one or all wheels of a particular truck, and any number of engines, generators, and/or energy storage devices may be mounted to the frame within the car body to make up the propulsion subsystems 116, 156 on each of the powered units. The propulsion subsystems 116, 156 of each of the powered units may be further interconnected throughout the train 102 along one or more high voltage power cables in a power sharing arrangement. Energy storage devices (not shown) may also be included for short term or long term storage of energy generated by the propulsion subsystems or by the traction motors when the traction motors are operated in a dynamic braking or generating mode. Energy storage devices may include batteries, ultra-capacitors, flywheels, fluid accumulators, and other energy storage devices with capabilities to store large amounts of energy rapidly for short periods of time, or more slowly for longer periods of time, depending on the needs at any particular time.

The DC or AC power provided from the propulsion subsystems 116, 156 or energy storage devices along the power cable may drive AC or DC traction motors to propel the wheels. Each of the traction motors may also be operated in a dynamic braking mode as a generator of electric power that may be provided back to the power cables and/or energy storage devices. Control over engine operation (e.g., starting, stopping, fueling, exhaust aftertreatment, etc.) and traction motor operation, as well as other locomotive controls, may be provided by way of an on-board controller 200, as described below, and various operational control devices housed within a cab supported by the frame of the train 102. In some implementations of this disclosure, initiation of these controls may be implemented in the cab of the lead powered unit 108 in the lead consist 114 of the train 102. In other alternative implementations, initiation of operational controls may be implemented off-board at the off-board remote controller interface 104, or at a powered unit of a trailing consist. As discussed above, the various computer control systems involved in the operation of the train 102 may be distributed across a number of local and/or remote physical locations and communicatively coupled over one or more wireless or wired communication networks.

Figure 2:
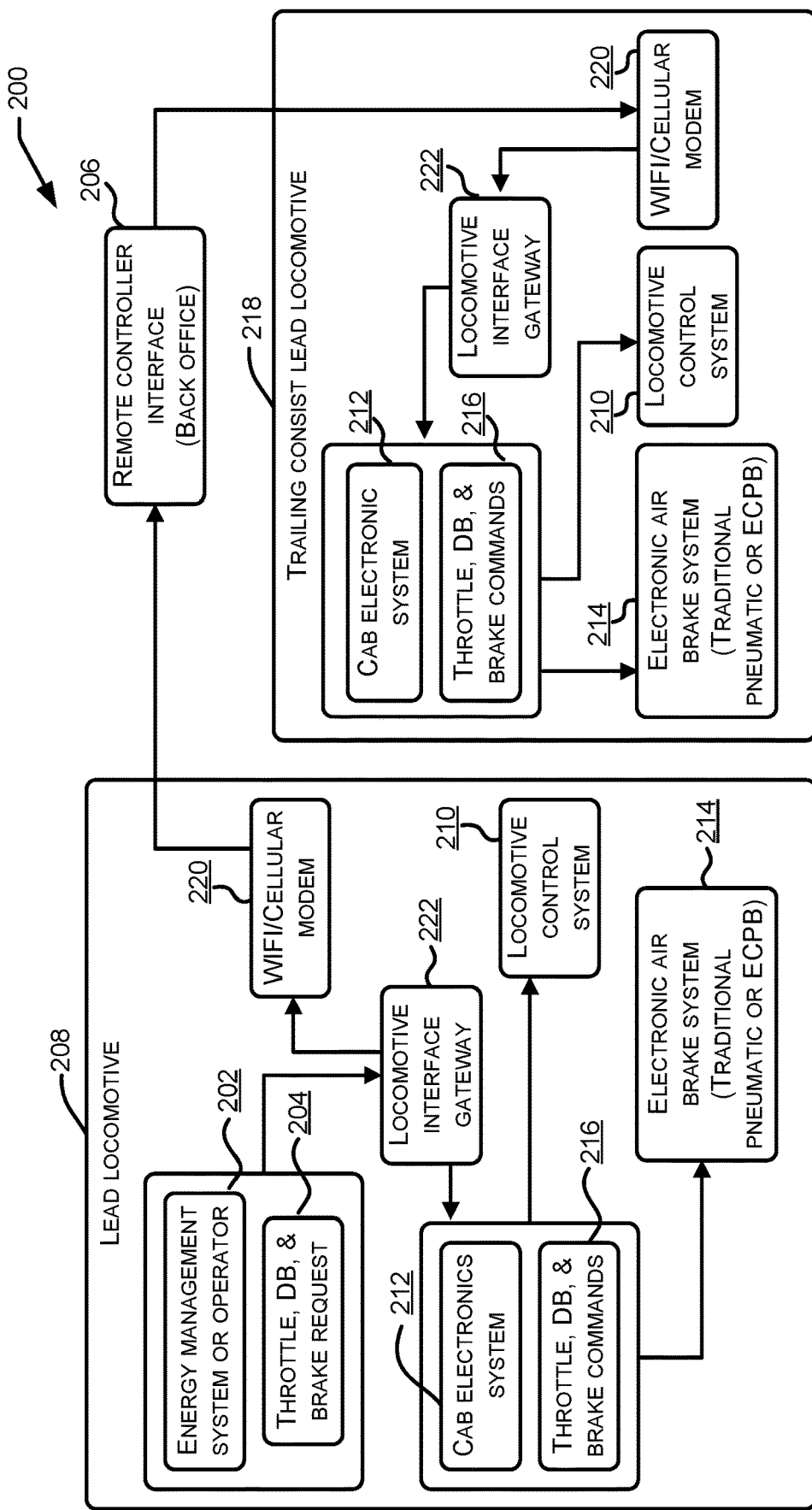
FIG. 2 is a block diagram of one implementation of a portion of the control system illustrated in FIG. 1.

As shown in FIG. 2, an exemplary implementation of the control system 100 may include the on-board controller 200. The on-board controller 200 may include an energy management system 202 configured to determine, e.g., one or more of throttle requests, dynamic braking requests, and pneumatic braking requests 204 for one or more of the powered and non-powered units of the train. The energy management system 202 may be configured to make these various requests based on a variety of measured operational parameters, track grade, track conditions, freight loads, trip plans, and predetermined maps or other stored data with one or more goals of improving availability, safety, timeliness, overall fuel economy and emissions output for individual powered units, consists, or the entire train. The energy management system 202 may receive updated information periodically, for example, from the back office 104, associated with the traveling route of the train 102 relative to the current location of the train 102. The updated information may include current conditions of the track ahead (no change from the stored data, a temporary speed limit due to track maintenance next two miles, a malfunctioning signal at Mile marker 123, noise restriction, grade information, etc.), weather conditions (temperature, wind speed and direction, rain, snow, etc.), and other local information.

The cab of the lead powered unit 108, 148 in each of the consists may also house a plurality of operational control devices and control system interfaces. The operational control devices may be used by an operator to manually control the locomotive, or may be controlled electronically via messages received from off-board the train. Operational control devices may include, among other things, an engine run/isolation switch, a generator field switch, an automatic brake handle, an independent brake handle, a lockout device, and any number of circuit breakers. Manual input devices may include switches, levers, pedals, wheels, knobs, push-pull devices, touch screen displays, etc.

Operation of the engines, generators, inverters, converters, and other auxiliary devices may be at least partially controlled by switches or other operational control devices that may be manually movable between a run or activated state and an isolation or deactivated state by an operator of the train 102. The operational control devices may be additionally or alternatively activated and deactivated by solenoid actuators or other electrical, electromechanical, or electro-hydraulic devices. The off-board remote controller interface 104, 206 may also require compliance with security protocols to ensure that only designated personnel may remotely activate or deactivate components on-board the train from the off-board remote controller interface after certain prerequisite conditions have been met. The off-board remote controller interface may include various security algorithms or other means of comparing an operator authorization input with a predefined security authorization parameter or level. The security algorithms may also establish restrictions or limitations on controls that may be performed based on the location of a locomotive, authorization of an operator, and other parameters.

Circuit breakers may be associated with particular components or subsystems of a locomotive on the train 102, and configured to trip when operating parameters associated with the components or subsystems deviate from expected or predetermined ranges. For example, circuit breakers may be associated with power directed to individual traction motors, HVAC components, and lighting or other electrical components, circuits, or subsystems. When a power draw greater than an expected draw occurs, the associated circuit breaker may trip, or switch from a first state to a second state, to interrupt the corresponding circuit. In some implementations of this disclosure, a circuit breaker may be associated with an on-board control system or communication unit that controls wireless communication with the off-board remote controller interface. After a particular circuit breaker trips, the associated component or subsystem may be disconnected from the main electrical circuit of the train 102 and remain nonfunctional until the corresponding breaker is reset. The circuit breakers may be manually tripped or reset. Alternatively, or in addition, the circuit breakers may include actuators or other control devices that can be selectively energized to autonomously or remotely switch the state of the associated circuit breakers in response to a corresponding command received from the off-board remote controller interface (back office) 104, 206. In some embodiments, a maintenance signal may be transmitted to the off-board remote controller interface 104, 206 upon switching of a circuit breaker from a first state to a second state, thereby indicating that action such as a reset of the circuit breaker may be needed. As discussed above with reference to FIG. 1, the off-board remote controller interface 104, 206 may communicate with the train 102 wirelessly or via a wired communication system.

In some situations, the train 102 may travel through several different geographic regions and encounter different operating conditions in each region. For example, different regions may be associated with varying track conditions, steeper or flatter grades, speed restrictions, noise restrictions, and/or other such conditions. Some operating conditions in a given geographic region may also change over time as, for example, track rails wear and speed and/or noise restrictions are implemented or changed. Other circumstantial conditions, such as distances between sidings, distances from rail yards, limitations on access to maintenance resources, and other such considerations may vary throughout the course of mission. Operators may therefore wish to implement certain control parameters in certain geographic regions to address particular operating conditions.

To help operators implement desired control strategies based on the geographic location of the train 102, the on-board controller 200 may be configured to include a graphical user interface (GUI) that allows operators and/or other users to establish and define the parameters of geo-fences along a travel route. A geo-fence is a virtual barrier that may be set up in a software program and used in conjunction with global positioning systems (GPS) or radio frequency identification (RFID) to define geographical boundaries. As an example, a geo-fence may be defined along a length of track that has a grade greater than a certain threshold. A first geo-fence may define a no-stop zone, where the track grade is so steep that a train will not be able to traverse the length of track encompassed by the first geo-fence if allowed to stop. A second geo-fence may define an unfavorable-stop zone, where the grade is steep enough that a train stopping in the unfavorable-stop zone may be able to traverse the second geo-fence after a stop, but will miss a trip objective such as arriving at a destination by a certain time. A third geo-fence may define a favorable-stop zone, where the grade of the track is small enough that the train will be able to come to a complete stop within the favorable-stop zone for reasons such as repair or adjustment of various components or subsystems, and then resume travel and traverse the third geo-fence while meeting all trip objectives.

The off-board remote controller interface 104 may include a GUI configured to display information and receive user inputs associated with the train. The GUI may be a graphic display tool including menus (e.g., drop-down menus), modules, buttons, soft keys, toolbars, text boxes, field boxes, windows, and other means to facilitate the conveyance and transfer of information between a user and off-board remote controller interface 104, 206. Access to the GUI may require user authentication, such as, for example, a username, a password, a pin number, an electromagnetic passkey, etc., to display certain information and/or functionalities of the GUI.

The energy management system 202 of the on-board controller 200 on-board a lead locomotive 208 may be configured to automatically determine one or more of throttle requests, dynamic braking requests, and pneumatic braking requests 204 for one or more of the powered and non-powered units of the train. The energy management system 202 may be configured to make these various requests based on a variety of measured operational parameters, track conditions, freight loads, trip plans, and predetermined maps or other stored data with a goal of improving one or more of availability, safety, timeliness, overall fuel economy and emissions output for individual locomotives, consists, or the entire train. Some of the measured operational parameters such as track grade or other track conditions may be associated with one or more predetermined geo-fences. The cab of the lead locomotive 208 in each of the consists 114, 140 along the train 102 may also house a plurality of input devices, operational control devices, and control system interfaces. The input devices may be used by an operator to manually control the locomotive, or the operational control devices may be controlled electronically via messages received from off-board the train. The input devices and operational control devices may include, among other things, an engine run/isolation switch, a generator field switch, an automatic brake handle (for the entire train and locomotives), an independent brake handle (for the locomotive only), a lockout device, and any number of circuit breakers. Manual input devices may include switches, levers, pedals, wheels, knobs, push-pull devices, and touch screen displays. The on-board controller 200 may also include a microprocessor-based locomotive control system 210 having at least one programmable logic controller (PLC), a cab electronics system 212, and an electronic air (pneumatic) brake system 214, all mounted within a cab of the locomotive. The cab electronics system 212 may comprise at least one integrated display computer configured to receive and display data from the outputs of one or more of machine gauges, indicators, sensors, and controls. The cab electronics system 212 may be configured to process and integrate the received data, receive command signals from the off-board remote controller interface 206, and communicate commands such as throttle, dynamic braking, and pneumatic braking commands 216 to the microprocessor-based locomotive control system 210.

The microprocessor-based locomotive control system 210 may be communicatively coupled with the traction motors, engines, generators, braking subsystems, input devices, actuators, circuit breakers, and other devices and hardware used to control operation of various components and subsystems on the locomotive. In various alternative implementations of this disclosure, some operating commands, such as throttle and dynamic braking commands, may be communicated from the cab electronics system 212 to the microprocessor-based locomotive control system 210, and other operating commands, such as braking commands, may be communicated from the cab electronics system 212 to a separate electronic air brake system 214. One of ordinary skill in the art will recognize that the various functions performed by the microprocessor-based locomotive control system 210 and electronic air brake system 214 may be performed by one or more processing modules or controllers through the use of hardware, software, firmware, or various combinations thereof. Examples of the types of controls that may be performed by the microprocessor-based locomotive control system 210 may include radar-based wheel slip control for improved adhesion, automatic engine start stop (AESS) for improved fuel economy, control of the lengths of time at which traction motors are operated at temperatures above a predetermined threshold, control of generators/alternators, control of inverters/converters, the amount of exhaust gas recirculation (EGR) and other exhaust aftertreatment processes performed based on detected levels of certain pollutants, and other controls performed to improve safety, increase overall fuel economy, reduce overall emission levels, and increase longevity and availability of the locomotives. The at least one PLC of the microprocessor-based locomotive control system 210 may also be configurable to selectively set predetermined ranges or thresholds for monitoring operating parameters of various subsystems. When a component detects that an operating parameter has deviated from the predetermined range, or has crossed a predetermined threshold, a maintenance signal may be communicated off-board to the remote controller interface 206. The at least one PLC of the microprocessor-based locomotive control system 210 may also be configurable to receive one or more command signals indicative of at least one of a throttle command, a dynamic braking readiness command, and an air brake command 216, and output one or more corresponding command control signals configured to at least one of change a throttle position, activate or deactivate dynamic braking, and apply or release a pneumatic brake, respectively.

The cab electronics system 212 may provide integrated computer processing and display capabilities on-board the train 102, and may be communicatively coupled with a plurality of cab gauges, indicators, and sensors, as well as being configured to receive commands from the off-board remote controller interface 206. The cab electronics system 212 may be configured to process outputs from one or more of the gauges, indicators, and sensors, and supply commands to the microprocessor-based locomotive control system 210. In various implementations, the off-board remote controller interface 206 may comprise a distributed system of servers, on-board and/or off-board the train, or a single laptop, hand-held device, or other computing device or server with software, encryption capabilities, and Internet access for communicating with the on-board controller 200 of the lead locomotive 208 of a lead consist and the lead locomotive 218 of a trailing consist.

Control command signals generated by the cab electronics system 212 on the lead locomotive 208 of the lead consist may be communicated to the microprocessor-based locomotive control system 210 of the lead locomotive of the lead consist, and may be communicated in parallel via a WiFi/cellular modem 220 off-board to the off-board remote controller interface 206. The lead communication unit 120 on-board the lead locomotive of the lead consist may include the WiFi/cellular modem 220 and any other communication equipment required to modulate and transmit the command signals off-board the locomotive and receive command signals on-board the locomotive. As shown in FIG. 2, the off-board remote controller interface 206 may relay commands received from the lead locomotive 208 via another WiFi/cellular modem 220 to another cab electronics system 212 on-board the lead locomotive 218 of the trailing consist. Additionally, or alternatively, the on-board controller 200 of the lead locomotive 208 of a lead consist and the lead locomotive 218 of a trailing consist may communicate directly with each other. The communication from the lead locomotive 208, via the remote controller interface 206, or directly, to the trailing consist lead locomotive 218 may be established wirelessly or by a wired communication system.

The control systems and interfaces on-board and off-board the train may embody single or multiple microprocessors, field programmable gate arrays (FPGAs), digital signal processors (DSPs), programmable logic controllers (PLCs), etc., that include means for controlling operations of the train 102 in response to operator requests, built-in constraints, sensed operational parameters, and/or communicated instructions from the off-board remote controller interface 104, 206. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

The locomotives 208, 218 may be outfitted with any number and type of sensors known in the art for generating signals indicative of associated operating parameters. In one example, a locomotive 208, 218 may include a temperature sensor configured to generate a signal indicative of a coolant temperature of an engine on-board the locomotive. Additionally, or alternatively, sensors may include brake temperature sensors, exhaust sensors, fuel level sensors, pressure sensors, knock sensors, reductant level or temperature sensors, speed sensors, motion detection sensors, location sensors, or any other sensor known in the art. The signals generated by the sensors may be directed to the cab electronics system 212 for further processing and generation of appropriate commands.

Any number and type of warning devices may also be located on-board each locomotive, including an audible warning device and/or a visual warning device. Warning devices may be used to alert an operator on-board a locomotive of an impending operation, for example startup of the engine(s). Warning devices may be triggered manually from on-board the locomotive (e.g., in response to movement of a component or operational control device to the run state) and/or remotely from off-board the locomotive (e.g., in response to control command signals received from the off-board remote controller interface 206.) When triggered from off-board the locomotive, a corresponding command signal used to initiate operation of the warning device may be communicated to the on-board controller 200 and the cab electronics system 212.

The on-board controller 200 and the off-board remote controller interface 206 may include any means for monitoring, recording, storing, indexing, processing, and/or communicating various operational aspects of the locomotive 208, 218. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or non-transitory computer-readable media such as computer chips and secondary storage devices, including hard disks, floppy disks, optical media, CD-ROM, or other forms of RAM or ROM.

The off-board remote controller interface 206 may be configured to execute instructions stored on non-transitory computer-readable medium to perform methods of remote control of the locomotive or other powered unit of the train 102. That is, as will be described in more detail in the following section, on-board control (manual and/or autonomous control) of some operations of the locomotive (e.g., operations of traction motors, engine(s), circuit breakers, etc.) may be selectively overridden by the off-board remote controller interface 206.

Remote control of the various powered and non-powered units on the train 102 through communication between the on-board cab electronics system 212 and the off-board remote controller interface 206 may be facilitated via the various communication units 120, 126, 160, 166 spaced along the train 102. The communication units may include hardware and/or software that enables sending and receiving of data messages between the powered units of the train and the off-board remote controller interfaces. The data messages may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable the communication units to exchange information between the off-board remote controller interfaces and the various components and subsystems of the train 102.

As shown in the exemplary embodiment of FIG. 2, the cab electronics system 212 may be configured to receive the requests 204 after they have been processed by a locomotive interface gateway (LIG) 222, which may also enable modulation and communication of the requests through a WiFi/cellular modem 220 to the off-board remote controller interface (back office) 206. The cab electronics system 212 may be configured to communicate commands (e.g., throttle, dynamic braking, and pneumatic braking commands 216) to the microprocessor-based locomotive control system 210 and an electronic air brake system 214 on-board the lead locomotive 208 in order to autonomously control the movements and/or operations of the lead locomotive.

In parallel with communicating commands to the microprocessor-based locomotive control system 210 of the lead locomotive 208, the cab electronics system 212 on-board the lead locomotive 208 of the lead consist may also communicate commands to the off-board remote controller interface 206. The commands may be communicated either directly or through the locomotive interface gateway 222, via the WiFi/cellular modem 220, off-board the lead locomotive 208 of the lead consist to the off-board remote controller interface 206. The off-board remote controller interface 206 may then communicate the commands received from the lead locomotive 208 to the trailing consist lead locomotive 218. The commands may be received at the trailing consist lead locomotive 218 via another WiFi/cellular modem 220, and communicated either directly or through another locomotive interface gateway 222 to a cab electronics system 212. The cab electronics system 212 on-board the trailing consist lead locomotive 218 may be configured to communicate the commands received from the lead locomotive 208 of the lead consist to a microprocessor-based locomotive control system 210 and an electronic air brake system 214 on-board the trailing consist lead locomotive 218. The commands from the lead locomotive 208 of the lead consist may also be communicated via the network connection 118 from the trailing consist lead locomotive 218 to one or more trailing powered units 150 of the trailing consist 140. The result of configuring all of the lead powered units of the lead and trailing consists to communicate via the off-board remote controller interface 206 is that the lead powered unit of each trailing consist may respond quickly and in close coordination with commands responded to by the lead powered unit of the lead consist. Additionally, each of the powered units in various consists along a long train may quickly and reliably receive commands such as throttle, dynamic braking, and pneumatic braking commands 216 initiated by a lead locomotive in a lead consist regardless of location and conditions.

The integrated cab electronics system 212 on the powered units of the lead consist 114 and on the powered units of the trailing consist 140 may also be configured to receive and generate commands for configuring or reconfiguring various switches, handles, and other operational control devices on-board each of the powered units of the train as required before the train begins on a journey, or after a failure occurs that requires reconfiguring of all or some of the powered units. Examples of switches and handles that may require configuring or reconfiguring before a journey or after a failure may include an engine run switch, a generator field switch, an automatic brake handle, and an independent brake handle. Remotely controlled actuators on-board the powered units in association with each of the switches and handles may enable remote, autonomous configuring and reconfiguring of each of the devices. For example, before the train begins a journey, or after a critical failure has occurred on one of the lead or trailing powered units, commands may be sent from the off-board remote controller interface 206 to any powered unit in order to automatically reconfigure all of the switches and handles as required on-board each powered unit without requiring an operator to be on-board the train. Following the reconfiguring of all of the various switches and handles on-board each locomotive, the off-board remote controller interface may also send messages to the cab electronics systems on-board each locomotive appropriate for generating other operational commands such as changing throttle settings, activating or deactivating dynamic braking, and applying or releasing pneumatic brakes. This capability saves the time and expense of having to delay the train while sending an operator to each of the powered units on the train to physically switch and reconfigure all of the devices required.

Figure 3:
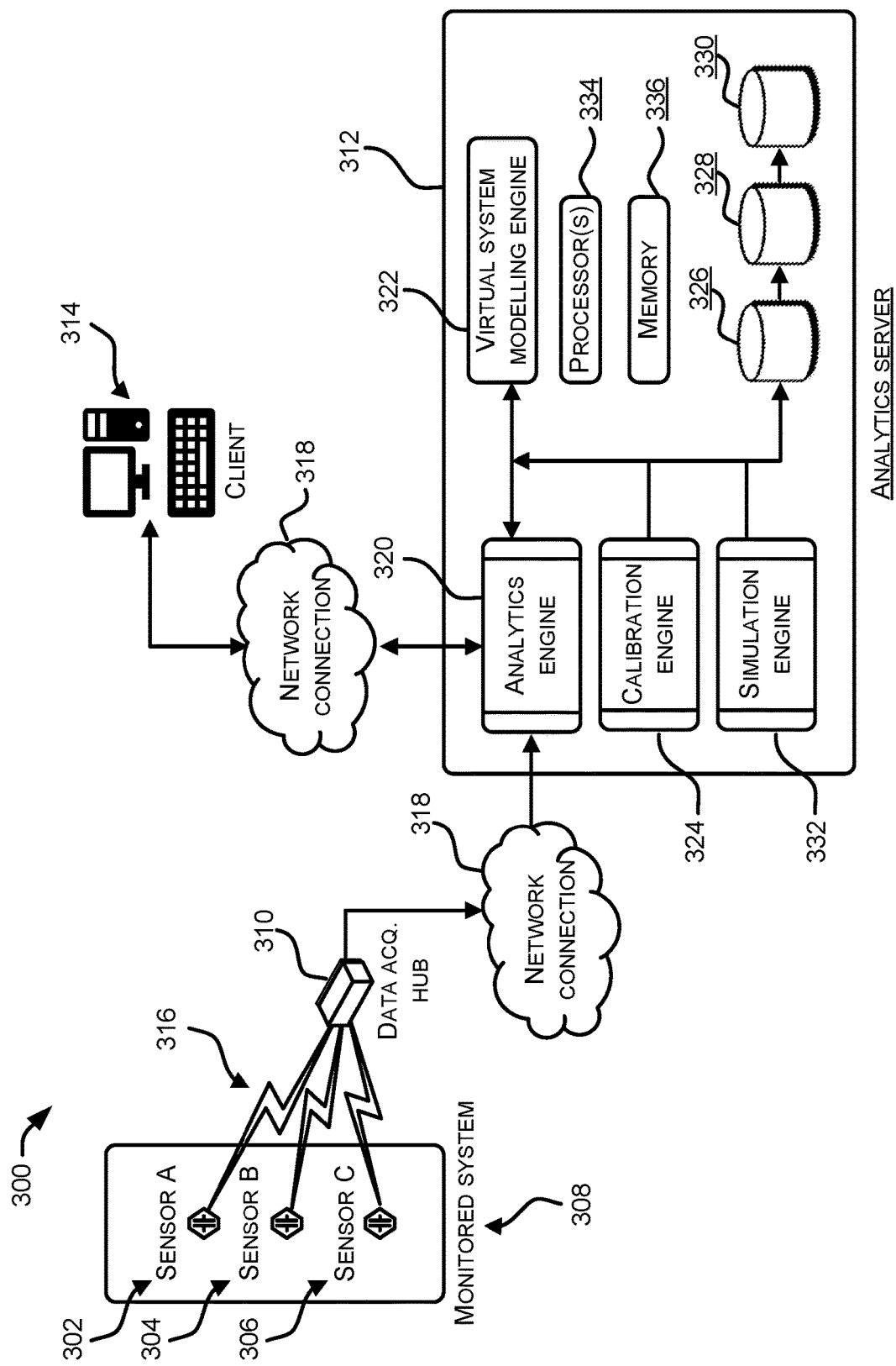
FIG. 3 is an illustration of a system for utilizing real-time data for predictive analysis of the performance of a monitored system, in accordance with one embodiment.

FIG. 3 is an illustration of a system 300 according to an exemplary embodiment of this disclosure for utilizing real-time data for predictive analysis of the performance of a monitored computer system, such as the control system 100 shown in FIG. 1. The system 300 may include a series of sensors (i.e., Sensor A 302, Sensor B 304, Sensor C 306) interfaced with the various components of a monitored system 308, a data acquisition hub 310, an analytics server 312, and a client 314. The monitored system 308 may include one or more of the train control systems illustrated in FIG. 2, such as an energy management system 202, a cab electronics system 212, and a locomotive control system 210. It should be understood that the monitored system 308 can be any combination of components whose operations can be monitored with sensors and where each component interacts with or is related to at least one other component within the combination. For the monitored system 308 that is a train control system, the sensors may include brake temperature sensors, exhaust sensors, fuel level sensors, battery charge level sensors, pressure sensors, knock sensors, reductant level or temperature sensors, generator power output sensors, voltage or current sensors, speed sensors, motion detection sensors, location sensors, wheel temperature or bearing temperature sensors, or any other sensor known in the art for monitoring various train operational parameters. The analytics server 312 may be a part of the energy management system 202 of the on-board controller 200. However, the analytics server 312 may alternatively be located off-board the train 102, for example, in the back office 104.

The sensors are configured to provide output values for system parameters that indicate the operational status and/or "health" of the monitored system 308. The sensors may include sensors for monitoring the operational status and/or health of the various physical systems associated with operation of a train, as well as the operational status of the various computer systems and subsystems associated with operation of the train. The sensors may also be configured to measure additional data that can affect system operation. For example, sensor output can include environmental information, e.g., temperature, humidity, etc., which can impact the operation and efficiency of the various train control systems.

In one exemplary embodiment, the various sensors 302, 304, 306 may be configured to output data in an analog format. For example, electrical power sensor measurements (e.g., voltage, current, etc.) are sometimes conveyed in an analog format as the measurements may be continuous in both time and amplitude. In another embodiment, the sensors may be configured to output data in a digital format. For example, the same electrical power sensor measurements may be taken in discrete time increments that are not continuous in time or amplitude. In still another embodiment, the sensors may be configured to output data in either an analog or digital format depending on the sampling requirements of the monitored system 308.

The sensors can be configured to capture output data at split-second intervals to effectuate "real time" data capture. For example, in one embodiment, the sensors can be configured to generate hundreds of thousands of data readings per second. It should be appreciated, however, that the number of data output readings taken by a sensor may be set to any value as long as the operational limits of the sensor and the data processing capabilities of the data acquisition hub 310 are not exceeded.

Each sensor may be communicatively connected to the data acquisition hub 310 via an analog or digital data connection 316. The data acquisition hub 310 may be a standalone unit or integrated within the analytics server 312 and can be embodied as a piece of hardware, software, or some combination thereof. In one embodiment, the digital data connection 316 is a "hard wired" physical data connection (e.g., serial, network, etc.). For example, a serial or parallel cable connection between the sensor and the data acquisition hub 310. In another embodiment, the digital data connection 316 is a wireless data connection. For example, a 5G radio frequency (RF) cellular connection, BLUETOOTH™, infrared or equivalent connection between the sensor and the data acquisition hub 310.

The data acquisition hub 310 may be configured to communicate "real-time" data from the monitored system 308 to the analytics server 312 using a network connection 318. In one embodiment, the network connection 318 is a "hardwired" physical connection. For example, the data acquisition hub 310 may be communicatively connected (via Category 5 (CATS), fiber optic or equivalent cabling) to a data server (not shown) that is communicatively connected (via CATS, fiber optic or equivalent cabling) through the Internet and to the analytics server 312 server, the analytics server 312 being also communicatively connected with the Internet (via CATS, fiber optic, or equivalent cabling). In another embodiment, the network connection 318 is a wireless network connection (e.g., 5G cellular, Wi-Fi, WLAN, etc.). For example, utilizing an 802.11a/b/g or equivalent transmission format. In practice, the network connection utilized is dependent upon the particular requirements of the monitored system 308. Data acquisition hub 310 may also be configured to supply warning and alarms signals as well as control signals to monitored system 308 and/or sensors 302, 304, and 306 as described in more detail below.

As shown in FIG. 3, in one embodiment, the analytics server 312 may host an analytics engine 320, a virtual system modeling engine 322, a calibration engine 324, and several databases 326, 328, and 330. Additional engines or processing modules may also be included in analytics server 312, such as a simulation engine 332, an operator behavior modeling engine, and other machine learning or artificial intelligence engines or processing modules. The analytics server 312 may also comprise one or more processors (processors) 334, which may execute any modules, components, or systems associated with the analytics server 312, such as the analytics engine 320, the virtual system modeling engine 322, the calibration engine 324, the databases 326, 328, and 330, and the simulation engine 332. In some examples, the processors 334 may include a central processing unit (CPU), a graphics processing unit (GPU), both CPU and GPU, or other processing units or components known in the art. Additionally, each of the processors 334 may possess its own local memory, which also may store program modules, program data, and/or one or more operating systems. The analytics server 312 may additionally comprise computer-readable media, such as memory 336, which may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the analytics server 312. In some examples, one or more of the modules may include or be associated with computer-executable instructions that are stored by the computer-readable media and that are executable by one or more processors to perform such operations.

The virtual system modeling engine 322 can be, e.g., a computer modeling system. In this context, the modeling engine can be used to precisely model and mirror the actual train control systems and subsystems. Analytics engine 320 can be configured to generate predicted data for the monitored systems and analyze differences between the predicted data and the real-time data received from data acquisition hub 310. Analytics server 312 may be interfaced with a monitored system 308 via sensors, e.g., sensors 302, 304, and 306. The various sensors are configured to supply real-time data from the various physical components and computer systems and subsystems of train 102. The real-time data is communicated to analytics server 312 via data acquisition hub 310 and network connection 318. Data acquisition hub 310 can be configured to provide real-time data to analytics server 312 as well as alarming, sensing and control featured for the monitored system 308, such as the control system 100. Additionally, or alternatively, the functionalities of the analytics engine 320 may be partially, or completely, realized by a cloud-based system. For example, a cloud-based predictive analytics system, which provides alarming, monitoring, and other functions based on differences between expected and observed measurements, may aggregate information across multiple units.

The real-time data from data acquisition hub 310 can be passed to a comparison engine, which can be separate from or form part of analytics engine 320. The comparison engine can be configured to continuously compare the real-time data with predicted values generated by virtual system modeling engine 322 or another simulation engine included as part of analytics server 312. Based on the comparison, the comparison engine can be further configured to determine whether deviations between the real-time values and the expected values exist, and if so to classify the deviation, e.g., high, marginal, low, etc. The deviation level can then be communicated to a decision engine, which can also be included as part of analytics engine 320 or as a separate processing module. The decision engine can be configured to look for significant deviations between the predicted values and real-time values as received from the comparison engine. If significant deviations are detected, the decision engine can also be configured to determine whether an alarm condition exists, activate the alarm and communicate the alarm to a Human-Machine Interface (HMI) for display in real-time via, e.g., client 314. The decision engine of analytics engine 320 can also be configured to perform root cause analysis for significant deviations in order to determine the interdependencies and identify any failure relationships that may be occurring. The decision engine can also be configured to determine health and performance levels and indicate these levels for the various processes and equipment via the HMI of client 314. All of which, when combined with the analytical and machine learning capabilities of analytics engine 320 allows the operator to minimize the risk of catastrophic equipment failure by predicting future failures and providing prompt, informative information concerning potential/predicted failures before they occur. Avoiding catastrophic failures reduces risk and cost, and maximizes facility performance and up time.

The simulation engine 332, included as part of the analytics server 312, may operate on complex logical models of the various control systems and subsystems of on-board controller 200 and the control system 100. These models may be continuously and automatically synchronized with the actual status of the control systems based on the real-time data provided by the data acquisition hub 310 to analytics server 312 and the updated information received by the energy management system 202 including current conditions of the track ahead (no change from the stored data, a temporary speed limit due to track maintenance next two miles, a malfunctioning signal at Mile marker 123, etc.), weather conditions (temperature, wind speed and direction, rain, snow, etc.), and other local information. In other words, the models are updated based on current switch status, breaker status, e.g., open-closed, equipment on/off status, current local conditions, etc. Thus, the models are automatically updated based on such status, which allows the simulation engine 332 to produce predicted data based on the current train operational status and environment. This in turn, allows accurate and meaningful comparisons of the real-time data to the predicted data. Example models that can be maintained and used by analytics server 312 may include models used to calculate train trip optimization, determine component operational requirements for improved asset life expectancy, determine efficient allocation and utilization of computer control systems and computer resources, etc. In certain embodiments, data acquisition hub 310 may also be configured to supply equipment identification associated with the real-time data. This identification can be cross referenced with identifications provided in the models.

In one embodiment, if a comparison performed by a comparison engine indicates that a differential between a real-time sensor output value and an expected value exceeds a threshold value but remains below an alarm condition (i.e., alarm threshold value), a calibration request may be generated by the analytics engine 320. If the differential exceeds the alarm threshold value, an alarm or notification message may be generated by the analytics engine 320. The alarm or notification message may be sent directly to the client (i.e., user) 314 for display in real-time on a web browser, pop-up message box, e-mail, or equivalent on the client 314 display panel. In another embodiment, the alarm or notification message may be sent to a wireless mobile device to be displayed for the user by way of a wireless router or equivalent device interfaced with the analytics server 312. The alarm can be indicative of a need for a repair event or maintenance, such as synchronization of any computer control systems that are no longer communicating within allowable latency parameters. The responsiveness, calibration, and synchronization of various computer systems can also be tracked by comparing expected operational characteristics based on historical data associated with the various systems and subsystems of the train to actual characteristics measured after implementation of control commands, or by comparing actual measured parameters to predicted parameters under different operating conditions. As described above, the alarm may also be generated by a cloud-based predictive analytics system.

Virtual system modeling engine 322 may create multiple models that can be stored in the virtual system model database 326. Machine learning algorithms may be employed by virtual system modeling engine 322 to create a variety of virtual model applications based on real time and historical data gathered by data acquisition hub 310 from a large variety of sensors measuring operational parameters of train 102. The virtual system models may include components for modeling reliability of various train physical systems and distributed computer control systems. In addition, the virtual system models created by virtual system modeling engine 322 may include dynamic control logic that permits a user to configure the models by specifying control algorithms and logic blocks in addition to combinations and interconnections of train operational components and control systems. Virtual system model database 326 can be configured to store the virtual system models, and perform what-if simulations. In other words, the database of virtual system models can be used to allow a system designer to make hypothetical changes to the train control systems and test the resulting effect, without having to actually take the train out of service or perform costly and time consuming analysis. Such hypothetical simulations performed by virtual systems modeling engine 322 can be used to learn failure patterns and signatures as well as to test proposed modifications, upgrades, additions, etc., for the train control system. The real-time data, as well as detected trends and patterns produced by analytics engine 320 can be stored in real-time data acquisition databases 328 and 330.

As discussed above, the virtual system model may be periodically calibrated and synchronized with "real-time" sensor data outputs and the updated information received by the energy management system 202 so that the virtual system model provides data output values that are consistent with the actual "real-time" values received from the sensor output signals. Unlike conventional systems that use virtual system models primarily for system design and implementation purposes (i.e., offline simulation and facility planning), the virtual system train control models or other virtual computer system models described herein may be updated and calibrated with the real-time system operational data to provide better predictive output values. A divergence between the real-time sensor output values and the predicted output values may generate either an alarm condition for the values in question and/or a calibration request that is sent to a calibration engine 324.

The analytics engine 320 and virtual system modeling engine 322 may be configured to implement pattern/sequence recognition into a real-time decision loop that, e.g., is enabled by machine learning. The types of machine learning implemented by the various engines of analytics server 312 may include various approaches to learning and pattern recognition. The machine learning may include the implementation of associative memory, which allows storage, discovery, and retrieval of learned associations between extremely large numbers of attributes in real time. At a basic level, an associative memory stores information about how attributes and their respective features occur together. The predictive power of the associative memory technology comes from its ability to interpret and analyze these co-occurrences and to produce various metrics. Associative memory is built through "experiential" learning in which each newly observed state is accumulated in the associative memory as a basis for interpreting future events. Thus, by observing normal system operation over time, and the normal predicted system operation over time, the associative memory is able to learn normal patterns as a basis for identifying non-normal behavior and appropriate responses, and to associate patterns with particular outcomes, contexts or responses. The analytics engine 320 is also better able to understand component mean time to failure rates through observation and system availability characteristics. This technology in combination with the virtual system model can present a novel way to digest and comprehend alarms in a manageable and coherent way.

The machine learning algorithms assist in uncovering the patterns and sequencing of alarms to help pinpoint the location and cause of any actual or impending failures of physical systems or computer systems. Typically, responding to the types of alarms that may be encountered when operating a train is done manually by experts who have gained familiarity with the system through years of experience. However, at times, the amount of information is so great that an individual cannot respond fast enough or does not have the necessary expertise. An "intelligent" system employing machine learning algorithms that observe human operator actions and recommend possible responses could improve train operational safety by supporting an existing operator, or even managing the various train control systems autonomously. Current simulation approaches for maintaining transient stability and synchronization between the various train control systems may involve traditional numerical techniques that typically do not test all possible scenarios. The problem is further complicated as the numbers of components and pathways increase. Through the application of the machine learning algorithms and virtual system modeling according to various embodiments of this disclosure, by observing simulations of various outcomes determined by different train control inputs and operational parameters, and by comparing them to actual system responses, it may be possible to improve the simulation process, thereby improving the overall design of future train control systems.

The virtual system model database 326, as well as databases 328 and 330, can be configured to store one or more virtual system models, virtual simulation models, and real-time data values, each customized to a particular system being monitored by the analytics server 312. Thus, the analytics server 312 can be utilized to monitor more than one train control system or other computer system associated with the train at a time. As depicted herein, the databases 326, 328, and 330 can be hosted on the analytics server 312 and communicatively interfaced with the analytics engine 320. In other embodiments, databases 326, 328, and 330 can be hosted on one or more separate database servers (not shown) that are communicatively connected to the analytics server 312 in a manner that allows the virtual system modeling engine 322 and analytics engine 320 to access the databases as needed. In one embodiment, the client 314 may modify the virtual system model stored on the virtual system model database 326 by using a virtual system model development interface including well-known modeling tools that are separate from the other network interfaces. For example, dedicated software applications that run in conjunction with the network interface may allow a client 314 to create or modify the virtual system models.

The client 314 may utilize a variety of network interfaces (e.g., web browsers) to access, configure, and modify the sensors (e.g., configuration files, etc.), analytics engine 320 (e.g., configuration files, analytics logic, etc.), calibration parameters (e.g., configuration files, calibration logic, etc.), virtual system modeling engine 322 (e.g., configuration files, simulation parameters, etc.) and virtual system model of the various train control systems under management (e.g., virtual system model operating parameters and configuration files). Correspondingly, data from those various components of the monitored system 308 can be displayed on a client 314 display panel for viewing by a system administrator or equivalent. As described above, analytics server 312 may be configured to synchronize and/or calibrate the various train control systems and subsystems in the physical world with virtual and/or simulated models and report, e.g., via visual, real-time display, deviations between the two as well as system health, alarm conditions, predicted failures, etc. In the physical world, sensors 302, 304, 306 produce real-time data for the various train control processes and equipment that make up the monitored system 308. In the virtual world, simulations generated by the virtual system modeling engine 322 may provide predicted values, which are correlated and synchronized with the real-time data. The real-time data can then be compared to the predicted values so that differences can be detected. The significance of these differences can be determined to characterize the health status of the various train control systems and subsystems. The health status can then be communicated to a user on-board the train or off-board at a remote control facility via alarms and indicators, as well as to client 314, e.g., via web pages.

In some embodiments, as discussed above, the analytics engine 320 may include a machine learning engine. The machine learning engine may include a train control strategy engine configured to receive training data from a data acquisition hub communicatively coupled to one or more sensors associated with one or more locomotives of a train. The training data may include real-time configuration and operational data, and may be communicated to the data acquisition hub and to the machine learning engine over wireless and/or wired networks. The training data may be relevant to train control operations, including a plurality of first input conditions and a plurality of first response maneuvers or first actions to be taken by an operator of the train associated with the first input conditions. The training data may include historical operational data acquired by various sensors associated with one or more locomotives of the train during one or more actual train runs. The training data may also include data indicative of specific actions taken by a train operator, or directly or indirectly resulting from actions taken by the train operator, under a large variety of operating conditions, and on trains with the same or different equipment, different operational characteristics, and different parameters. The machine learning engine and train control strategy engine may be configured to train a learning system using the training data to generate a second response maneuver or second action to be taken by the train operator based on a second input condition.

The response maneuvers generated by the machine learning engine may be integrated with and implemented by various train control systems and subsystems, such as the cab electronics system 212, and microprocessor-based locomotive control system 210 shown in FIG. 2. The resultant controls performed by the various train control systems and subsystems based on outputs from the machine learning engine may improve the operation of trains that are being operated fully manually, semi-autonomously, or fully autonomously by enabling a shared mental model of train operator behavior between experienced human train operators or engineers, less experienced engineers, and autonomous or semi-autonomous train control systems. For example, a learning system according to various embodiments of this disclosure can be trained to learn how experienced human engineers respond to different inputs under various operating conditions, such as during the automatic implementation of train control commands by energy management programs, positive train control (PTC) algorithms, and automatic train operations (ATO), during extreme weather conditions, during emergency conditions caused by other train traffic or equipment failure on the train, while approaching and maneuvering in train yards, and under other train operating conditions. The trained learning system can then improve train control systems being operated by less experienced engineers, semi-autonomously, or fully autonomously to perform operational maneuvers in a manner consistent with how the experienced human engineers would respond under similar conditions. Unlike existing methods for maneuvering autonomous vehicles, such as by following a control law that optimizes a variable such as a throttle notch setting at the expense of performing other operational maneuvers that an experienced human engineer would readily understand, the machine learning engine disclosed herein may allow less experienced train engineers or autonomously-operated trains to execute maneuvers including selecting optimum control settings for a particular set of operational conditions that cannot be reduced to a control law. Train control systems that include a machine learning engine configured to encode real human engineer behavior into a train control strategy engine may enable less experienced train engineers, or semi-autonomously or fully autonomously operated trains to perform optimized train handling across different terrains, with different trains, and under different operating conditions.

In some embodiments, the machine learning engine of analytics engine 320 may be configured to receive training data including a plurality of first input conditions and a plurality of first response maneuvers associated with the first input conditions. The first input conditions can represent conditions which, when applied to a train operating system or when perceived by a train engineer, lead to a particular response maneuver being performed. A "response maneuver" as used herein, refers to any action that may be taken by a human engineer or that may directly or indirectly result from an action taken by a human engineer. The input conditions can include a state of a particular locomotive in a consist, a representation or state of an environment surrounding the consist, including behavior of other trains or locomotives on the same or interconnected tracks in the same geographical area, and commands, instructions, or other communications received from other entities.

The first input conditions can include an indication of a maneuver command. A maneuver command can be a command, instruction, or other information associated with a maneuver that a locomotive is expected, desired, or required to perform. Maneuver commands can vary in specificity and may include commands specific to an exact set of tracks along which the locomotive is required to travel to reach a general objective, specific throttle notch settings for one or more lead and/or trailing locomotives at different locations, under different loads or trip parameters, braking and dynamic braking commands, and other control settings to be implemented by the cab electronics system, throttle, dynamic braking and braking commands, and the locomotive control system.

The machine learning engine may be configured to train a learning system using the training data to generate a second response maneuver based on a second input condition. The machine learning engine can provide the training data as an input to the learning system, monitor an output of the learning system, and modify the learning system based on the output. The machine learning engine can compare the output to the plurality of first response maneuvers, determine a difference between the output and the plurality of first response maneuvers, and modify the learning system based on the difference between the output and the plurality of first response maneuvers. For example, the plurality of first response maneuvers may represent a goal or objective that the machine learning engine is configured to cause the learning system to match, by modifying characteristics of the learning system until the difference between the output and the plurality of first response maneuvers is less than a threshold difference. In some embodiments, the machine learning engine can be configured to modify characteristics of the learning system to minimize a cost function or optimize some other objective function or goal, such as reduced emissions, during a particular train trip or over a plurality of trips or time periods. The machine learning engine can group the training data into a first set of training data for executing a first learning protocol, and a second set of training data for executing a second learning protocol.

The learning system can include a learning function configured to associate the plurality of input conditions to the plurality of first response maneuvers, and the learning function can define characteristics, such as a plurality of parameters. The machine learning engine can be configured to modify the plurality of parameters to decrease the difference between the output of the learning system (e.g., the output of the learning function) and the plurality of first response maneuvers. Once trained, the learning system can be configured to receive the second input condition and apply the learning function to the second input condition to generate the second response maneuver. In some embodiments, the learning system may include a neural network. The neural network can include a plurality of layers each including one or more nodes, such as a first layer (e.g., an input layer), a second layer (e.g., an output layer), and one or more hidden layers. The neural network can include characteristics such weights and biases associated with computations that can be performed between nodes of layers. The machine learning engine can be configured to train the neural network by providing the first input conditions to the first layer of the neural network. The neural network can generate a plurality of first outputs based on the first input conditions, such as by executing computations between nodes of the layers. The machine learning engine can receive the plurality of first outputs, and modify a characteristic of the neural network to reduce a difference between the plurality of first outputs and the plurality of first response maneuvers.

In some embodiments, the learning system may include a classification engine, such as a support vector machine (SVM). The SVM can be configured to generate a mapping of first input conditions to first response maneuvers. For example, the machine learning engine may be configured to train the SVM to generate one or more rules configured to classify training pairs (e.g., each first input condition and its corresponding first response maneuver). The classification of training pairs can enable the mapping of first input conditions to first response maneuvers by classifying particular first response maneuvers as corresponding to particular first input conditions. Once trained, the learning system can generate the second response maneuver based on the second input condition by applying the mapping or classification to the second input condition.

In some embodiments, the learning system may include a Markov decision process engine. The machine learning engine may be configured to train the Markov decision process engine to determine a policy based on the training data, the policy indicating, representing, or resembling how a particular locomotive would behave while controlled by an experienced human engineer in response to various input conditions. The machine learning engine can provide the first input conditions to the Markov decision process engine as a set or plurality of states (e.g., a set or plurality of finite states). The machine learning engine can provide the first response maneuvers to the Markov decision process as a set or plurality of actions (e.g., a set or plurality of finite actions). The machine learning engine can execute the Markov decision process engine to determine the policy that best represents the relationship between the first input conditions and first response maneuvers. It will be appreciated that in various embodiments, the learning system can include various other machine learning engines and algorithms, as well as combinations of machine learning engines and algorithms, that can be executed to determine a relationship between the plurality of first input conditions and the plurality of first response maneuvers and thus train the learning system.

In some implementations of this disclosure, train configuration and operational data may be provided to the machine learning engine over a 5G cellular radio frequency telecommunications network interconnecting multiple nodes of a distributed computer control system. But alternative embodiments of the present disclosure may be implemented over a variety of data communication network environments using software, hardware, or a combination of hardware and software to provide the distributed processing functions.

Figure 4:
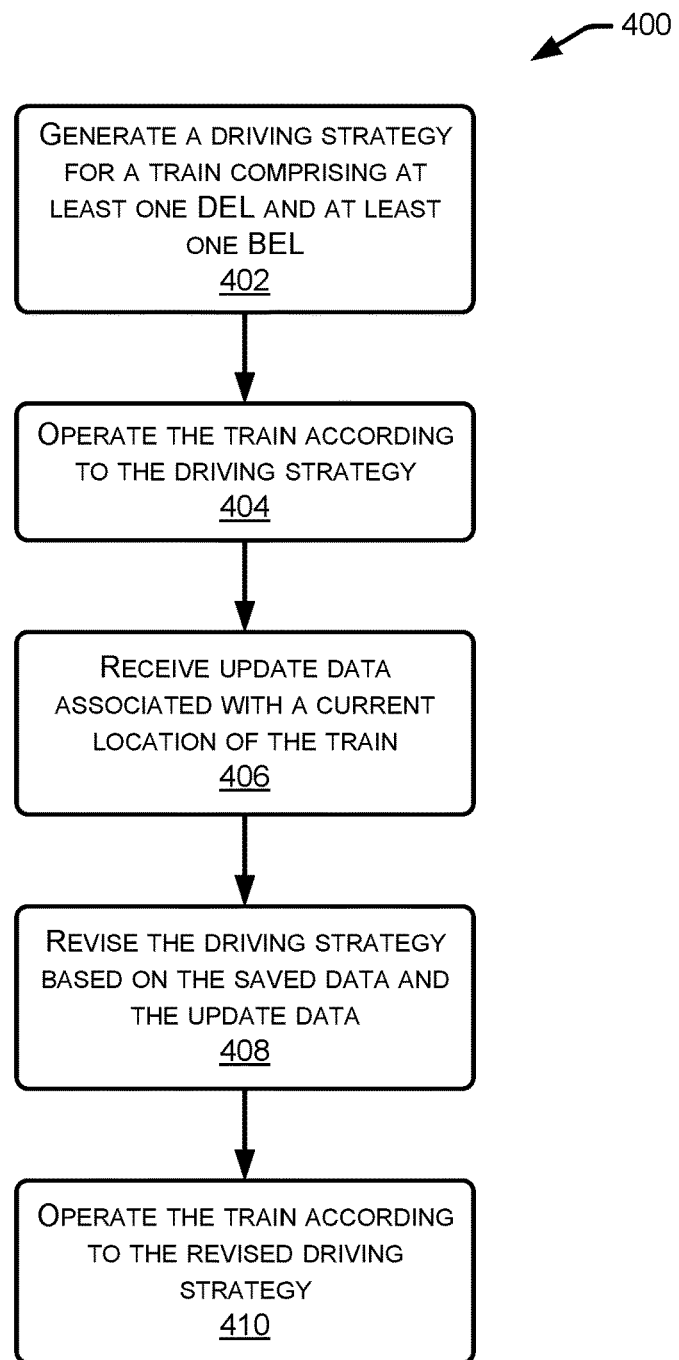
FIG. 4 is a flowchart of an example process for utilizing a driving strategy for a train having at least one diesel-electric locomotive (DEL) and at least one battery-electric locomotive (BEL).

FIG. 4 is a process 400 of an example flowchart for utilizing a driving strategy for a hybrid train having at least one diesel-electric locomotive (DEL) and at least one battery-electric locomotive (BEL). The process 400 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Computer-executable instructions may also be referred to as processor-executable instructions. For the purpose of discussion, unless otherwise specified, FIG. 4 will be described below with respect to the processors 334 of the analytics server 312 performing the steps. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

At block 402, the analytics engine 320 may generate a driving strategy for a traveling route of the train 102 based on saved data, such as the data saved in databases 326, 328, and 330 for optimizing one or more aspects for the train 102 over the traveling route, such as improving availability, safety, timeliness, overall fuel economy and emissions output for individual powered units, consists, or the entire train 102. In this example, the train 102 may be a hybrid train comprising at least one diesel-electric locomotive (DEL) and at least one battery-electric locomotive (BEL). As described above with reference to FIG. 3, the train control strategy engine of the analytics engine 320 may receive the training data from the data acquisition hub 310 including real-time configuration of the train 102 and operational data of the train 102 that are relevant to train control operations, and a plurality of first input conditions and a plurality of first response maneuvers or first actions to be taken by an operator of the train 102 associated with the first input conditions. The training data may include historical configuration of the train 102 and historical operational data of the train 102 acquired by various sensors, such as the sensors 302, 304, and 306, associated with one or more locomotives of the train 102 during one or more actual train runs. The training data may also include data indicative of specific actions taken by a train operator, or directly or indirectly resulting from actions taken by the train operator, under a large variety of operating conditions, and on trains with the same or different equipment, different operational characteristics, and different parameters. The training data may additionally include conditions of a segment of the track 106, and geo-fence information over the segment. Based on the training data, the analytics engine 320 may generate the one or more driving strategies for optimizing different aspects of the train 102 over the traveling route.

At block 404, the train 102 may be operated according to the driving strategy, for example, by the locomotive control system 210 as discussed above with reference to FIG. 2. As the train 102 begins to travel, the train 102 may periodically receive update data relevant to operation of the train 102 for the traveling route, for example, from the back office 104. At block 406, the energy management system 202 may receive update data associated with a current location of the train 102. For example, the back office 104 may periodically provide the update data associated with the current location of the train 102, such as local information associated with a segment of the traveling route associated with the current location of the train 102. The update data may include local information, such as weather information, grade information and condition of the track, speed restriction, noise restriction, and distance information. While some of the update data may be the same as the stored data, for example, the speed limit of the segment in the update data may be the same the speed limit from the databases 326, 328, and/or 330, other information may have changed from the information stored in the databases 326, 328, and/or 330, such as the weather and track conditions. At block 408, the analytics engine 320 may take the changes from the update information into account, and revise the driving strategy based on the saved data and the update data. At block 410, the locomotive control system 210 may operate the train 102 according to the revised driving strategy.

Figure 5:
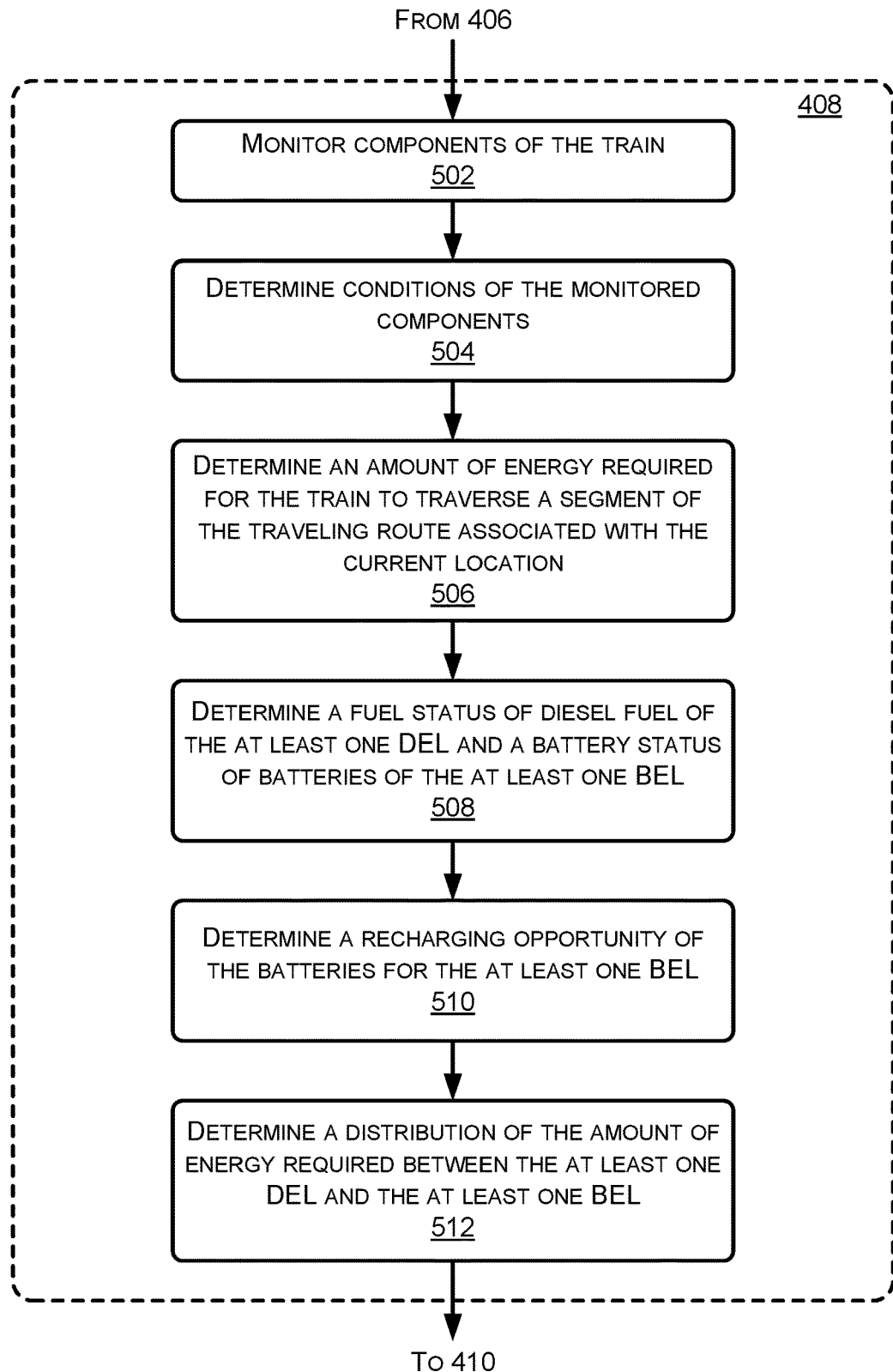
FIG. 5 is a flowchart representing an example detail process of one of the blocks of FIG. 4.

FIG. 5 is a flowchart representing an example detail process of block 408 of FIG. 4 for revising the driving strategy based on the update data. As described above with reference to FIG. 4, the update data may include local data associated with the current location of the train 102 that are periodically provided by the back office 104, such as weather information, grade information of the track, speed restriction, noise restriction, and distance information. The update data may also include information associated with components associated with the monitored system 308. As described above with reference to FIG. 3, the monitored system 308 can be any combination of components whose operations can be monitored with sensors and where each component interacts with or is related to at least one other component within the combination. The sensors are configured to provide output values for system parameters that indicate the operational status and/or "health" of the monitored system 308. The sensors may include brake temperature sensors, exhaust sensors, fuel level sensors, pressure sensors, knock sensors, reductant level or temperature sensors, generator power output sensors, voltage or current sensors, speed sensors, motion detection sensors, location sensors, wheel temperature or bearing temperature sensors, or any other sensor known in the art for monitoring various train operational parameters.

At block 502, sensors, such as the sensors 302, 304, and 306 of the monitored system 308, may monitor components of the train 102 in real time and provide the output values to the analytics engine 320. At block 504, the analytics engine 320 may determine the conditions or operational status of the monitored components based on the output values. For example, since the driving strategy based on the saved data was generated, some components may have failed and alternate or backup components are currently being utilized, which may require different power from the original components, or some other components may have degraded in performance and now require additional power to maintain the original and/or expected performance levels, etc.

At block 506, the analytics engine 320 may determine an amount of energy required for the train 102 to traverse a segment of the traveling route associated with the current location of the train 102 based on the driving strategy, the update data, and the conditions of the monitored components. For example, the segment may be the next 10 miles of the traveling route from the current location of the train 102 and may comprise three miles of 2% grade uphill, followed by two miles of level track, and then three miles of 1% grade downhill based on the driving strategy and/or the data in the database(s) 326, 328, and/or 330. The update information may include information different from the information used generate the driving strategy for the segment including weather information, such as temperature, a wind direction and speed, track conditions, such being icy or under maintenance. For example, the analytics engine 320 may determine that the train 102 would require 700 kWh, to traverse the segment at the speed set by the driving strategy under the current condition, which may be 50 kWh more than the amount of energy calculated and allotted by the driving strategy for the segment due to the headwind requiring more power to traction motors, high temperature requiring additional air conditioning, and some components experiencing degraded performance.

At block 508, sensors, such as the sensors 302, 304, and 306, may monitor a fuel status of diesel fuel of the at least one DEL and a battery status of batteries of the at least one BEL, and the analytics engine 320 may determine the fuel level of the diesel fuel, a charge level of the batteries, and a charge capacity of the batteries. At block 510, the analytics engine 320 may determine a recharging opportunity of the batteries for the at least one BEL and an expected amount of charge to be recovered. The analytics engine 320 may determine an amount of energy that could be recovered based on the three-mile downhill at the end of the segment where the traction motors may be operated in a dynamic braking or generating mode to recharge the batteries. For example, the expected charge recovered may be 50 kWh. At block 512, the analytics engine 320 may determine a distribution of the amount of energy required between the at least one DEL and the at least one BEL based on the driving strategy, the update data, the conditions of the monitored components, the fuel status, the battery status, and the recharging opportunity for the segment.

Figure 6:
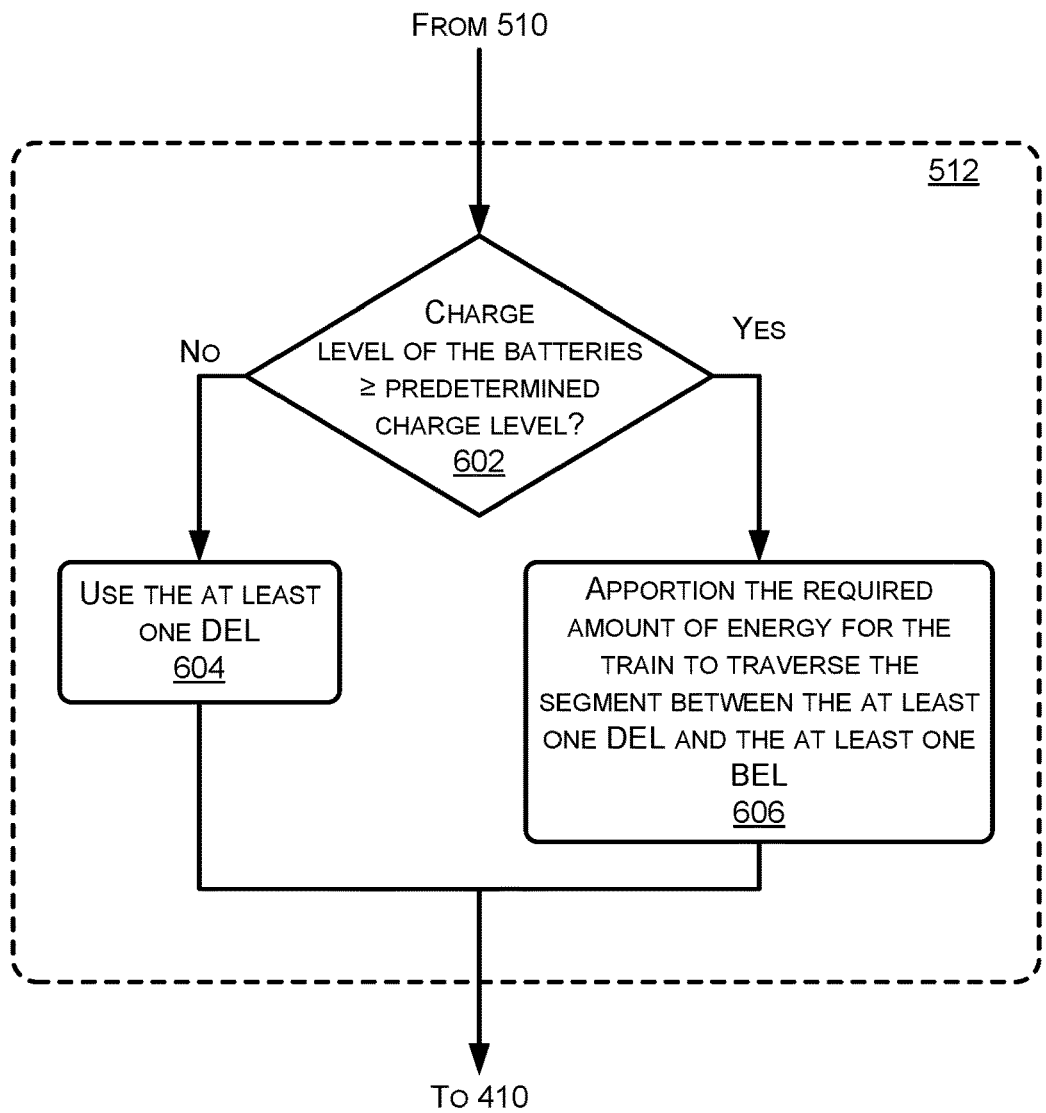
FIG. 6 is a flowchart representing an example detail process of one of the blocks of FIG. 5.

FIG. 6 is a flowchart representing an example detail process of block 512 of FIG. 5 for distributing the amount of energy required between the at least one DEL and the at least one BEL. Based on the driving strategy, the update data, the conditions of the monitored components, the fuel status, the battery status, and the recharging opportunity for the segment, the analytics engine 320 may determine a portion, or a percentage, of the required amount of energy for the train 102 to traverse the segment which each of the at least one DEL and the at least BEL contributes.

At block 602, the analytics engine 320 may determine whether the charge level of the batteries of the at least one BEL is greater than or equal to a predetermined charge level. If the charge level of the batteries of the at least one BEL is less than the predetermined charge level ("No" branch), the analytics engine 320 may determine that the at least one DEL needs to provide all of power required for the train 102 to traverse the segment, and allocate all of the amount of energy required to the at least one DEL at block 604. If the charge level of the batteries of the at least one BEL is greater than or equal to the predetermined charge level ("Yes" branch), the analytics engine 320 may determine to apportion the required amount of energy for the train 102 to traverse the segment between the at least one DEL and the at least one BEL at block 606. In this example, because the analytics engine 320 has determined that 50 kWh can be recovered from the three-mile downhill section at the end of the segment, the analytics engine 320 may allocate at least 50 kWh to the at least one BEL and the remainder to the at least one DEL for traversing the segment. The analytics engine 320 may determine appropriate energy distribution between the at least one DEL and the at least one BEL in association with other machine learning or artificial intelligence engines or processing modules included in analytics server 312 as described above with reference to FIG. 3.

Figure 7:
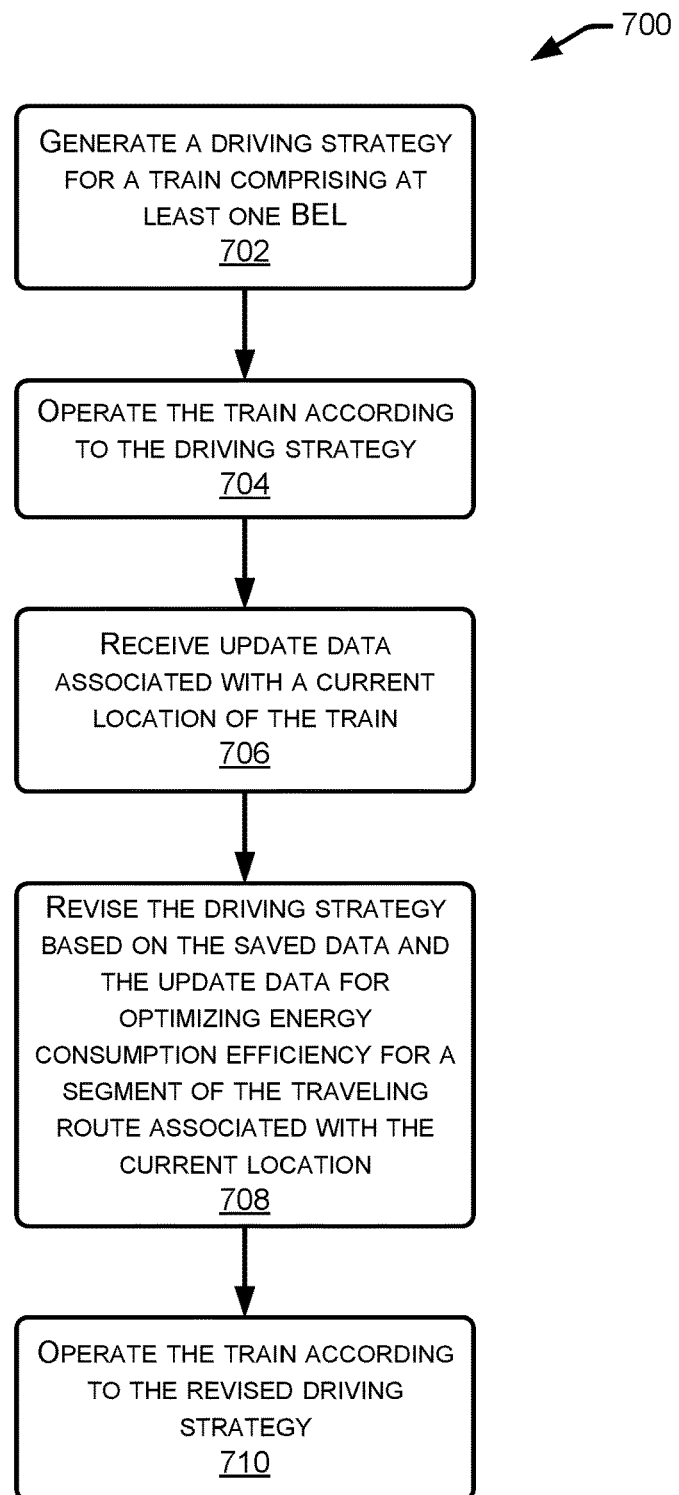
FIG. 7 is a flowchart of an example process for utilizing a driving strategy for a train having at least one battery-electric locomotive (BEL) for optimizing energy consumption efficiency.

FIG. 7 is a process 700 of an example flowchart for utilizing a driving strategy for a train having at least one battery-electric locomotive (BEL) for optimizing energy consumption efficiency. The process 700 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Computer-executable instructions may also be referred to as processor-executable instructions. For the purpose of discussion, unless otherwise specified, FIG. 7 will be described below with respect to the processors 334 of the analytics server 312 performing the steps. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

At block 702, the analytics engine 320 may generate a driving strategy for a traveling route of the train 102 based on saved data, such as the data saved in databases 326, 328, and 330. The train 102 may be an electric train comprising at least one battery-electric locomotive (BEL) or a hybrid train comprising at least one diesel-electric locomotive (DEL) and at least one BEL. As described above with reference to FIG. 3, the train control strategy engine of the analytics engine 320 may receive the training data from the data acquisition hub 310 including real-time configuration of the train 102 and operational data of the train 102 that are relevant to train control operations, and a plurality of first input conditions and a plurality of first response maneuvers or first actions to be taken by an operator of the train 102 associated with the first input conditions. The training data may include historical configuration of the train 102 and historical operational data of the train 102 acquired by various sensors, such as the sensors 302, 304, and 306, associated with one or more locomotives of the train 102 during one or more actual train runs. The training data may also include data indicative of specific actions taken by a train operator, or directly or indirectly resulting from actions taken by the train operator, under a large variety of operating conditions, and on trains with the same or different equipment, different operational characteristics, and different parameters. The training data may additionally include conditions of a segment of the track 106, and geo-fence information over the segment. Based on the training data, the analytics engine 320 may generate the one or more driving strategies for optimizing different aspects of the train 102 over the traveling route.

At block 704, the train 102 may be operated according to the driving strategy, for example, by the locomotive control system 210 as discussed above with reference to FIG. 2. As the train 102 begins to travel, the train 102 may periodically receive update data relevant to operation of the train 102 for the traveling route, for example, from the back office 104. At block 706, the energy management system 202 may receive update data associated with a current location of the train 102. For example, the back office 104 may periodically provide the update data associated with the current location of the train 102, such as local information associated with a segment of the traveling route associated with the current location of the train 102. The update data may include local information, such as weather information, grade information and condition of the track, speed restriction, noise restriction, and distance information. While some of the update data may be the same as the stored data, for example, the speed limit of the segment in the update data may be the same the speed limit from the databases 326, 328, and/or 330, other information may have changed from the information stored in the databases 326, 328, and/or 330, such as the weather and track conditions. At block 708, the analytics engine 320 may take the changes from the update information into account, and revise the driving strategy based on the saved data and the update data for optimizing energy consumption efficiency for traversing the segment of the traveling route associated with the current location. At block 710, the locomotive control system 210 may operate the train 102 according to the revised driving strategy.

Figure 8:
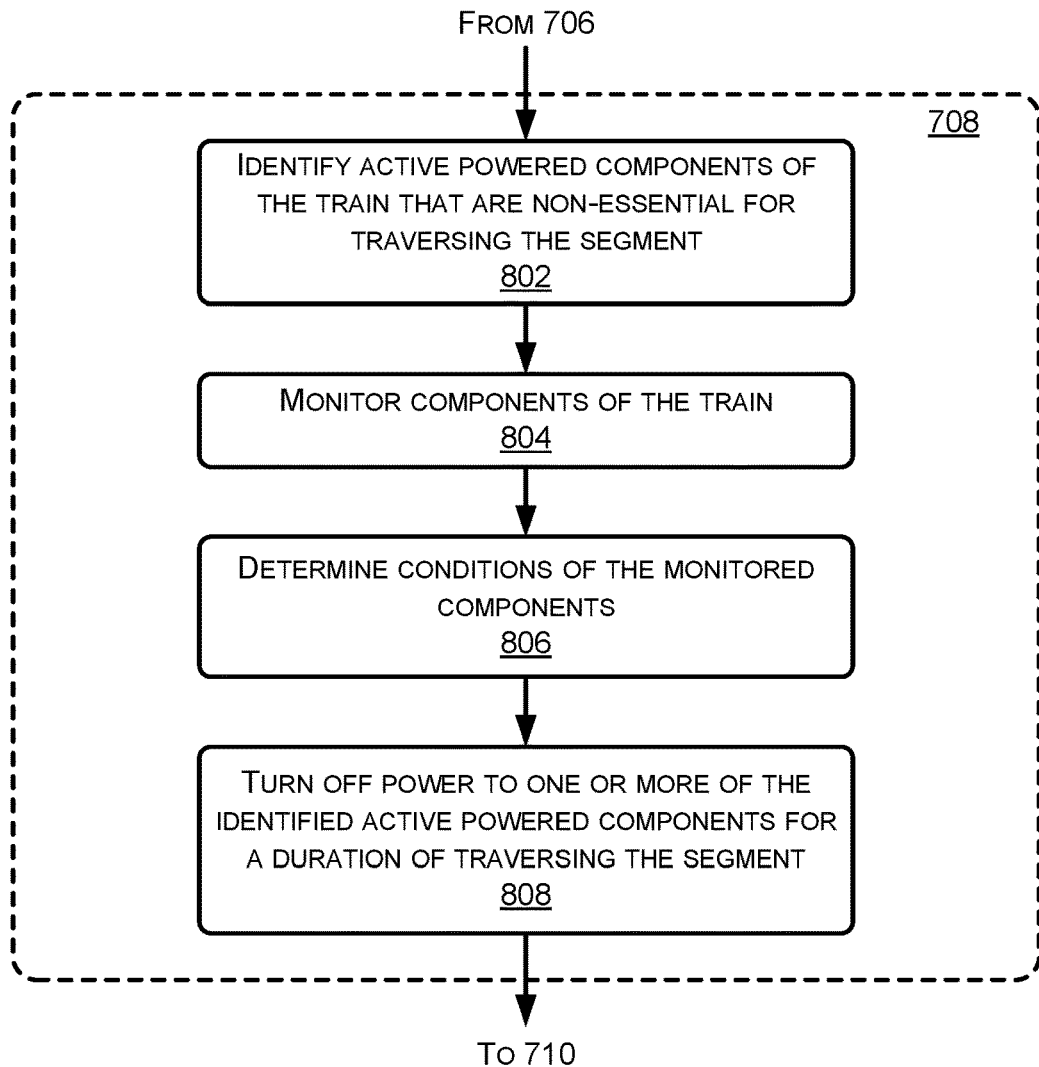
FIG. 8 is a flowchart representing an example detail process of one of the blocks of FIG. 7.

FIG. 8 is a flowchart representing an example detail process of block 708 of FIG. 7 for revising the driving strategy based on the update data for optimizing energy consumption efficiency for traversing the segment of the traveling route associated with the current location. As described above with reference to FIG. 7, the update data may include local data associated with the current location of the train 102 that are periodically provided by the back office 104, such as weather information, grade information of the track, speed restriction, noise restriction, and distance information. The update data may also include information associated with components associated with the monitored system 308. As described above with reference to FIG. 3, the monitored system 308 can be any combination of components whose operations can be monitored with sensors and where each component interacts with or is related to at least one other component within the combination. The sensors are configured to provide output values for system parameters that indicate the operational status and/or "health" of the monitored system 308. The sensors may include brake temperature sensors, exhaust sensors, fuel level sensors, pressure sensors, knock sensors, reductant level or temperature sensors, generator power output sensors, voltage or current sensors, speed sensors, motion detection sensors, location sensors, wheel temperature or bearing temperature sensors, or any other sensor known in the art for monitoring various train operational parameters.

At block 802, the analytics engine 320 may identify active powered components of the train 102 that are non-essential for traversing the segment. For example, the analytics engine 320 may determine that a fan does not need to operate at the current level for at least a portion of the segment; some lighting system can be turned off, the air conditioning system for some units may be turned off for the segment, etc. At block 804, sensors, such as the sensors 302, 304, and 306 of the monitored system 308, may monitor components of the train 102 in real time and provide the output values to the analytics engine 320. At block 806, the analytics engine 320 may determine the conditions or operational status of the monitored components based on the output values. For example, since the driving strategy based on the saved data was generated, some components may have failed and alternate or backup components are currently being utilized, which may require different power from the original components, some other components may have degraded in performance and now require additional power to maintain the original and/or expected performance levels, some components requires additional cooling, etc.

Determining the conditions or operational status of the monitored components includes determining a battery status of batteries, such as a charge level, of the at least one BEL, and determining a recharging opportunity of the batteries. For example, the segment may be the next 10 miles of the traveling route from the current location of the train 102 and may comprise three miles of 2% grade uphill, followed by two miles of level track, and then three miles of 1% grade downhill based on the driving strategy and/or the data in the database(s) 326, 328, and/or 330. The analytics engine 320 may determine that energy that could be recovered based on the three-mile downhill at the end of the segment where the traction motors may be operated in a dynamic braking or generating mode to recharge the batteries.

At block 808, the analytics engine 320 may determine to turn off power, via the energy management system 202, to one or more of the identified active powered components for a duration, or a portion of the duration, of traversing the segment based on the saved data, the update data, the conditions of the monitored components, the battery status and the recharging opportunity. Turning off power to one or more of the identified active powered components may include reducing power supplied to the one or more of the identified active powered components and/or reducing operation of the one or more of the identified active powered components including slowing down the traction motor(s) of the train 102. For example, power may be modulated, such as a pulse-duration modulation (PDM), to reduce the duty cycle of an active component, a setting of an active component may be changed to a lower setting, such as changing the fan speed from high to low, or reducing a compressor rate, and the like. The analytics engine 320 may determine appropriate active powered components to turn off in association with other machine learning or artificial intelligence engines or processing modules included in analytics server 312 as described above with reference to FIG. 3.

Figure 9:
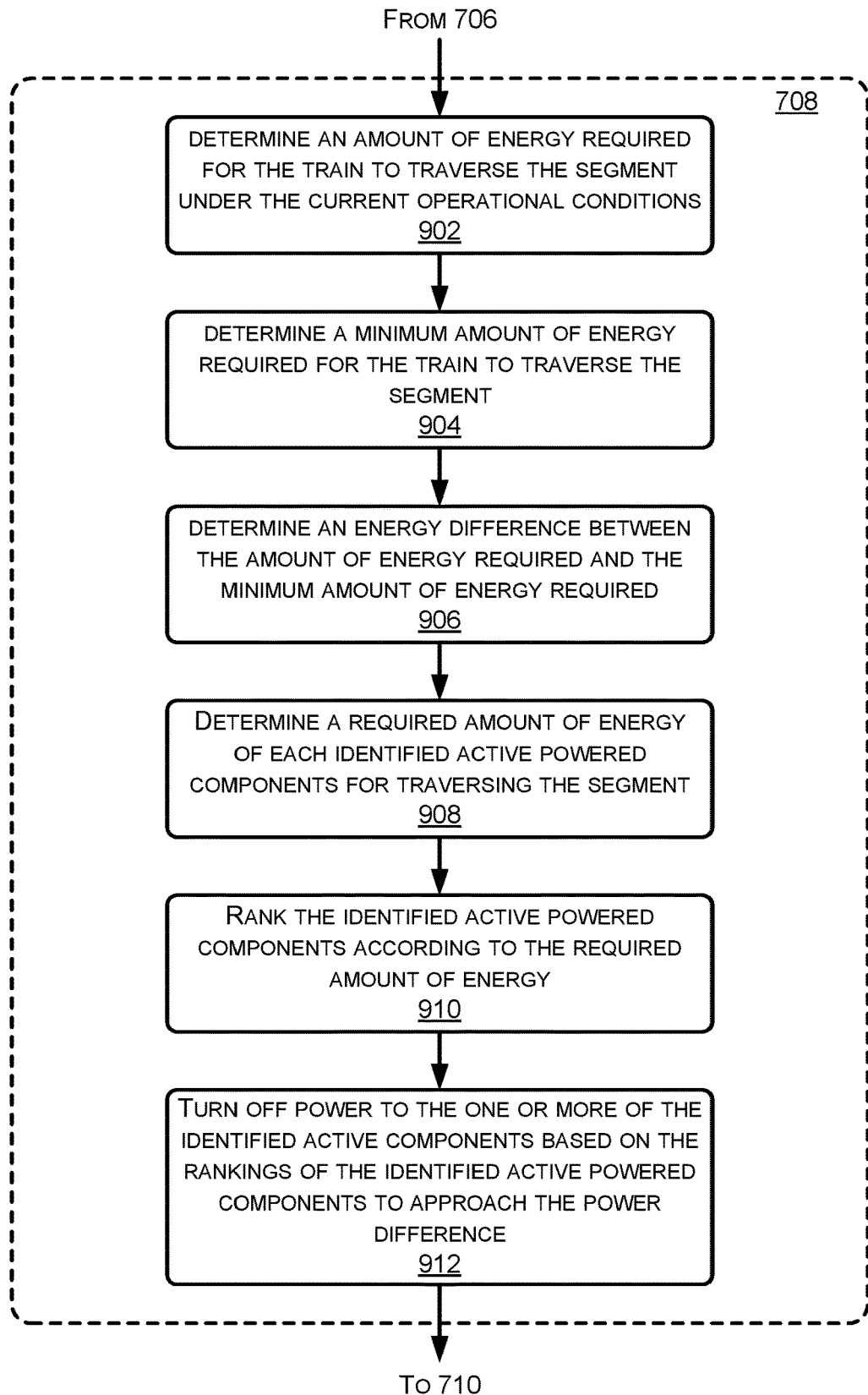
FIG. 9 is a flowchart representing another example detail process of one of the blocks of FIG. 7.

FIG. 9 is a flowchart representing another example detail process of block 708 of FIG. 7 for revising the driving strategy based on the update data for optimizing energy consumption efficiency for traversing the segment of the traveling route associated with the current location. The analytics engine 320 may, based on the driving strategy, the update data, and the conditions of the monitored components, determine an amount of energy required for the train 102 to traverse the segment under the current operational conditions at block 902. The analytics engine 320 may determine that, with the identified active powered components continued to be powered while traversing the segment would require 5% more energy than the amount of energy planned for the segment according to the driving strategy. For example, based on the update data and the data used to generate the driving strategy, the air conditioning system may require more energy to compensate for higher local temperature, the traction motors requiring more energy to compensate for worse track conditions or strong head wind, etc. At block 904, the analytics engine 320 may determine a minimum amount of energy required for the train 102 to traverse the segment. At block 906, the analytics engine 320 may determine an energy difference between the amount of energy required and the minimum amount of energy required. Alternatively, or additionally, the analytics engine 320 may determine the energy difference between the energy required with the identified active powered components continued to be powered to accommodate the changes based on the update data and the amount of energy planned for the segment according to the driving strategy. At block 908, the analytics engine 320 may determine a required amount of energy of each identified active powered components for traversing the segment, and rank the identified active powered components according to the required amount of energy at block 910. At block 912, the analytics engine 320 may, via the energy management system 202, turn off power to the one or more of the identified active powered components based on the rankings of the identified active powered components to approach the power difference. As discussed above with reference to FIG. 8, turning off power to one or more of the identified active powered components based on the ranking may include reducing power supplied to the one or more of the identified active powered components and/or reducing operation of the one or more of the identified active powered components based on the ranking. Alternatively, or additionally, power may be modulated, such as a pulse-duration modulation (PDM), to reduce the duty cycle of active components based on the rankings, a setting of an active component may be changed to a lower setting, such as changing the fan speed from high to low, or reducing a compressor rate, and the like. Alternatively, or additionally, the analytics engine 320 may determine to keep providing power to the identified active powered components if the analytics engine 320 determines that the recharging opportunity, such as the three-mile downhill at the end of the segment where the traction motors may be operated in a dynamic braking or generating mode to recharge the batteries, can provide sufficient recharging of the batteries. The analytics engine 320 may determine appropriate active powered components to turn off in association with other machine learning or artificial intelligence engines or processing modules included in analytics server 312 as described above with reference to FIG. 3.

INDUSTRIAL APPLICABILITY

The example systems and methods of the present disclosure are applicable to a variety of rail vehicles including multiple powered units, such as battery-electric locomotives, that are mechanically coupled or linked together in a consist. The systems and methods described herein may be used in association the on-board controller of the train, the off-board remote controller of the train, and/or the client device of the train. For example, an analytics engine of the system may generate a driving strategy for a traveling route of a train based on saved data in the system for optimizing various aspects of the train over the traveling route. The train, comprising at least one battery-electric locomotive (BEL), may be operated, by a locomotive control system of the system, according to the driving strategy. An energy management system of the system may receive update data associated with a current location of the train. For example, the back office may periodically provide the update data associated with the current location of the train, such as local information associated with a segment of the traveling route associated with the current location of the train. The update data may include local information, such as weather information, grade information and condition of the track, speed restriction, noise restriction, and distance information. While some of the update data may be the same as the stored data, other information may have changed from the information stored in the databases, such as the weather and the track condition.

The analytics engine may revise the driving strategy based on the saved data and the update data for optimizing energy consumption efficiency for the segment of the traveling route associated with the current location. The revising of the driving strategy may include monitoring components of the train, determining conditions of the monitored components including determining a battery status of batteries of the at least one BEL and determining a recharging opportunity of the batteries for the at least one BEL, and identifying active powered components of the train that are non-essential for traversing the segment. Based on the saved data, the update data, the conditions of the monitored components, the battery status, and the recharging opportunity, the analytics engine may turn off power to one or more of the identified active powered components for a duration of traversing the segment by, at least one of reducing power supplied to the one or more of the identified active powered components for the duration of traversing the segment, or reducing operation of the one or more of the identified active powered components for the duration of traversing the segment.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A system comprising:
   one or more processors; and
   memory communicatively coupled to the one or more processors, the memory storing thereon processor-executable instructions that, when executed by the one or more processors, cause the one or more processors to perform operations comprising:
   generating, by an analytics engine of the system, a driving strategy for a traveling route of a train based on saved data in the system for optimizing one or more aspects for the train over the traveling route, the train comprising at least one battery-electric locomotive (BEL),
   operating, by a locomotive control system of the system, the train according to the driving strategy,
   receiving, by an energy management system of the system, update data associated with a current location of the train,
   revising, by the analytics engine, the driving strategy based on the saved data and the update data, for optimizing energy consumption efficiency for a segment of the traveling route associated with the current location, including:
   identifying active powered components of the train that are non-essential for traversing the segment, and
   turning off power to one or more of the identified active powered components for a duration of traversing the segment, and
   operating, by the locomotive control system, the train according to the revised driving strategy.

2. The system of claim 1, wherein turning off power to the one or more of the identified active powered components for the duration of traversing the segment includes, at least one of:
   reducing power supplied to the one or more of the identified active powered components for the duration of traversing the segment, or
   reducing operation of the one or more of the identified active powered components for the duration of traversing the segment.

3. The system of claim 2,
   wherein revising, by the analytics engine, the driving strategy based on the saved data and the update data, for optimizing the energy consumption efficiency for the segment of the traveling route associated with the current location further includes:
   monitoring components of the train; and
   determining conditions of the monitored components including:
   determining a battery status of batteries of the at least one BEL, and
   determining a recharging opportunity of the batteries for the at least one BEL; and
   wherein turning off power to the one or more of the identified powered active components for the duration of traversing the segment is further based on the conditions of the monitored components, the battery status, and the recharging opportunity.

4. The system of claim 3,
   wherein determining conditions of the monitored components further includes:
   determining an amount of energy of each identified active powered components for traversing the segment; and
   ranking the identified active powered components according to the amount of energy, and
   wherein turning off power to the one or more of the identified active powered components for the duration of traversing the segment is further based on the rankings of the identified active powered components.

5. The system of claim 4,
   wherein revising, by the analytics engine, the driving strategy based on the saved data and the update data, for optimizing the energy consumption efficiency for the segment of the traveling route associated with the current location further comprises:
   based on the driving strategy, the update data, and the conditions of the monitored components:
   determining an amount of energy for the train to traverse the segment with the identified active powered components remaining powered;
   determining a minimum amount of energy for the train to traverse the segment; and
   determining an energy difference between the amount of energy and the minimum amount of energy, and wherein turning off power to the one or more of the identified active powered components for the duration of traversing the segment includes:
  turning off power to the one or more of the identified active powered components based on the rankings of the identified active powered components to approach the energy difference.

6. The system of claim 1, wherein generating, by the analytics engine of the system, the driving strategy for the traveling route of the train based on the saved data is based on training data including at least one of:
  operational data of the train;
  configuration of the train;
  condition of a track of the traveling route; and
  geo-fence information of the segment.

7. The system of claim 6, wherein the training data further includes:
  historical operational data of the train; and
  historical configuration of the train.

8. The system of claim 1, wherein the update data associated with the current location of the train includes at least one of:
  weather information;
  grade information of a track of the traveling route;
  speed restriction;
  noise restriction; or
  distance information.

9. A method comprising:
  generating, by an analytics engine of a system, a driving strategy for a traveling route of a train based on saved data in the system for optimizing one or more aspects for the train over the traveling route, the train comprising at least one battery-electric locomotive (BEL);
  operating, by a locomotive control system of the system, the train according to the driving strategy;
  receiving, by an energy management system of the system, update data associated with a current location of the train;
  revising, by the analytics engine, the driving strategy based on the saved data and the update data, for optimizing energy consumption efficiency for a segment of the traveling route associated with the current location, including:
    identifying active powered components of the train that are non-essential for traversing the segment, and
    turning off power to one or more of the identified active powered components for a duration of traversing the segment; and
  operating, by the locomotive control system, the train according to the revised driving strategy.

10. The method of claim 9, wherein turning off power to the one or more of the identified active powered components for the duration of traversing the segment includes, at least one of:
  reducing power supplied to the one or more of the identified active powered components for the duration of traversing the segment; or
  reducing operation of the one or more of the identified active powered components for the duration of traversing the segment.

11. The method of claim 10,
wherein revising, by the analytics engine, the driving strategy based on the saved data and the update data, for optimizing the energy consumption efficiency for the segment of the traveling route associated with the current location further comprises:
  monitoring components of the train; and
    determining conditions of the monitored components including:
      determining a battery status of batteries of the at least one BEL, and determining a recharging opportunity of the batteries for the at least one BEL; and
  wherein turning off power to the one or more of the identified powered active components for the duration of traversing the segment is further based on the conditions of the monitored components, the battery status, and the recharging opportunity.

12. The method of claim 11,
wherein determining conditions of the monitored components further includes:
  determining an amount of energy of each identified active powered components for traversing the segment; and
  ranking the identified active powered components according to the amount of energy, and
wherein turning off power to the one or more of the identified active powered components for the duration of traversing the segment is further based on the rankings of the identified active powered components.

13. The method of claim 12,
wherein revising, by the analytics engine, the driving strategy based on the saved data and the update data, for optimizing the energy consumption efficiency for the segment of the traveling route associated with the current location further comprises:
  based on the driving strategy, the update data, and the conditions of the monitored components:
    determining an amount of energy for the train to traverse the segment with the identified active powered components remaining powered;
    determining a minimum amount of energy for the train to traverse the segment; and
    determining an energy difference between the amount of energy and the minimum amount of energy, and
  wherein turning off power to the one or more of the identified active powered components for the duration of traversing the segment includes:
    turning off power to the one or more of the identified active powered components based on the rankings of the identified active powered components to approach the energy difference.

14. The method of claim 9, wherein generating, by the analytics engine of the system, the driving strategy for the traveling route of the train based on the saved data is based on training data including at least one of:
  operational data of the train;
  configuration of the train;
  condition of a track of the traveling route;
  geo-fence information of the segment;
  historical operational data of the train; and
  historical configuration of the train.

15. The method of claim 9, wherein the update data associated with the current location of the train includes at least one of:
  weather information;
  grade information of a track of the traveling route;
  speed restriction;
  noise restriction; or
  distance information.

16. Non-transitory computer-readable medium storing thereon processor-executable instructions that, when executed by one or more processors of a system, cause the one or more processors to perform operations comprising:

generating, by an analytics engine of a system, a driving strategy for a traveling route of a train based on saved data in the system for optimizing one or more aspects for the train over the traveling route, the train comprising at least one battery-electric locomotive (BEL);

operating, by a locomotive control system of the system, the train according to the driving strategy;

receiving, by an energy management system of the system, update data associated with a current location of the train;

revising, by the analytics engine, the driving strategy based on the saved data and the update data, for optimizing energy consumption efficiency for a segment of the traveling route associated with the current location, including:

identifying active powered components of the train that are non-essential for traversing the segment, and turning off power to one or more of the identified active powered components for a duration of traversing the segment by, at least one of:

reducing power supplied to the one or more of the identified active powered components for the duration of traversing the segment, or reducing operation of the one or more of the identified active powered components for the duration of traversing the segment; and operating, by the locomotive control system, the train according to the revised driving strategy.

17. The non-transitory computer-readable medium of claim 16, wherein revising, by the analytics engine, the driving strategy based on the saved data and the update data, for optimizing the energy consumption efficiency for the segment of the traveling route associated with the current location further includes:

monitoring components of the train; and determining conditions of the monitored components including:

determining a battery status of batteries of the at least one BEL, and determining a recharging opportunity of the batteries for the at least one BEL; and wherein turning off power to the one or more of the identified powered active components for the duration of traversing the segment is further based on the conditions of the monitored components, the battery status, and the recharging opportunity.

18. The non-transitory computer-readable medium of claim 17, wherein revising, by the analytics engine, the driving strategy based on the saved data and the update data, for optimizing the energy consumption efficiency for the segment of the traveling route associated with the current location further comprises:

based on the driving strategy, the update data, and the conditions of the monitored components:

determining an amount of energy for the train to traverse the segment with the identified active powered components remaining powered;

determining a minimum amount of energy for the train to traverse the segment; and determining an energy difference between the amount of energy and the minimum amount of energy, wherein determining conditions of the monitored components further includes:

determining an amount of energy of each identified active powered components for traversing the segment; and ranking the identified active powered components according to the amount of energy, and wherein turning off power to the one or more of the identified active powered components for the duration of traversing the segment includes:

turning off power to the one or more of the identified active powered components based on the rankings of the identified active powered components to approach the energy difference.

19. The non-transitory computer-readable medium of claim 16, wherein generating, by the analytics engine of the system, the driving strategy for the traveling route of the train based on the saved data is based on training data including at least one of:

operational data of the train;

configuration of the train;

condition of a track of the traveling route;

geo-fence information of the segment;

historical operational data of the train; and historical configuration of the train.

20. The non-transitory computer-readable medium of claim 16, wherein the update data associated with the current location of the train includes at least one of:

weather information;

grade information of a track of the traveling route;

speed restriction;

noise restriction; or distance information.

* * * * *